(12) United States Patent
Weber et al.

(10) Patent No.: US 8,662,687 B2
(45) Date of Patent: Mar. 4, 2014

(54) BREWSTER ANGLE FILM FOR LIGHT MANAGEMENT IN LUMINAIRES AND OTHER LIGHTING SYSTEMS

(75) Inventors: Michael F. Weber, Shoreview, MN (US); Timothy J. Nevitt, Red Wing, MN (US); John A. Wheatley, St. Paul, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 154 days.

(21) Appl. No.: 13/129,430

(22) PCT Filed: Nov. 17, 2009

(86) PCT No.: PCT/US2009/064770
§ 371 (c)(1),
(2), (4) Date: May 16, 2011

(87) PCT Pub. No.: WO2010/059614
PCT Pub. Date: May 27, 2010

(65) Prior Publication Data
US 2011/0228511 A1      Sep. 22, 2011

Related U.S. Application Data

(60) Provisional application No. 61/116,295, filed on Nov. 19, 2008.

(51) Int. Cl.
*F21V 9/14*        (2006.01)
*G02B 5/30*        (2006.01)
*G02B 27/28*       (2006.01)
*G02B 1/10*        (2006.01)

(52) U.S. Cl.
USPC .......... 362/19; 359/485.03; 359/586

(58) Field of Classification Search
USPC .............. 362/19; 359/485.03, 586
See application file for complete search history.

(56) References Cited

U.S. PATENT DOCUMENTS

| | | |
|---|---|---|
| 3,069,974 A | 12/1962 | Marks |
| 3,438,691 A | 4/1969 | Makas |
| 3,610,729 A | 10/1971 | Rogers |
| 3,829,680 A | 8/1974 | Jones |
| 4,218,727 A | 8/1980 | Shemitz |

(Continued)

FOREIGN PATENT DOCUMENTS

| | | |
|---|---|---|
| EP | 597261 | 5/1994 |
| JP | 2005/351956 A1 | 12/2005 |

(Continued)

OTHER PUBLICATIONS

Benya, Advanced Lighting Guidelines, 13 pages.

(Continued)

*Primary Examiner* — Anh Mai
*Assistant Examiner* — Michael Santonocito
(74) *Attorney, Agent, or Firm* — Daniel J. Iden

(57) ABSTRACT

Multilayer optical films are disclosed that exhibit high reflectivity at normal incidence for all polarizations but preferentially transmit high angle rays in one or two orthogonal planes of incidence. Both symmetrical and asymmetrical constructions are disclosed. The films can be used in direct-lit backlights and in lighting systems other than direct-lit backlights, such as edge-lit backlights, and non-backlight lighting systems such as systems intended for general illumination without the need for any graphic component, such as luminaires and task lights.

18 Claims, 15 Drawing Sheets

(56) References Cited

U.S. PATENT DOCUMENTS

| | | |
|---|---|---|
| 4,247,498 A | 1/1981 | Castro |
| 4,446,305 A | 5/1984 | Rogers |
| 4,539,256 A | 9/1985 | Shipman |
| 4,726,989 A | 2/1988 | Mrozinski |
| 4,867,881 A | 9/1989 | Kinzer |
| 5,103,337 A | 4/1992 | Schrenk |
| 5,126,880 A | 6/1992 | Wheatley |
| 5,360,659 A | 11/1994 | Arends |
| 5,486,949 A | 1/1996 | Schrenk |
| 5,568,316 A | 10/1996 | Schrenk |
| 5,612,820 A | 3/1997 | Schrenk |
| 5,825,543 A | 10/1998 | Ouderkirk |
| 5,882,774 A | 3/1999 | Jonza |
| 5,976,686 A | 11/1999 | Kaytor |
| 6,057,961 A | 5/2000 | Allen |
| 6,080,467 A | 6/2000 | Weber |
| 6,157,490 A | 12/2000 | Wheatley |
| 6,243,199 B1 | 6/2001 | Hansen |
| 6,268,961 B1 | 7/2001 | Nevitt |
| 6,368,699 B1 | 4/2002 | Gilbert |
| 6,504,589 B1 | 1/2003 | Kashima |
| 6,531,230 B1 | 3/2003 | Weber |
| 6,565,982 B1 | 5/2003 | Ouderkirk |
| 6,738,349 B1 | 5/2004 | Cen |
| 6,783,349 B2 | 8/2004 | Neavin |
| 6,811,274 B2 | 11/2004 | Olczak |
| 2002/0021387 A1 | 2/2002 | Larson |
| 2003/0165060 A1 | 9/2003 | Ouderkirk |
| 2003/0227678 A1 | 12/2003 | Lines |
| 2004/0135742 A1 | 7/2004 | Weber |
| 2004/0150997 A1 | 8/2004 | Ouderkirk |
| 2005/0001537 A1 | 1/2005 | West |
| 2006/0091412 A1 | 5/2006 | Wheatley |
| 2007/0091230 A1 | 4/2007 | Ouderkirk |
| 2007/0177272 A1 | 8/2007 | Benson |
| 2007/0177273 A1 | 8/2007 | Benson |
| 2007/0285601 A1 | 12/2007 | Hendrix |
| 2008/0037127 A1 | 2/2008 | Weber |
| 2008/0049184 A1* | 2/2008 | Tan et al. ............ 349/191 |
| 2008/0075948 A1 | 3/2008 | Padiyath |
| 2008/0291361 A1 | 11/2008 | Weber |
| 2010/0156953 A1 | 6/2010 | Nevitt |
| 2010/0165660 A1 | 7/2010 | Weber |
| 2010/0214762 A1 | 8/2010 | Nevitt |

FOREIGN PATENT DOCUMENTS

| | | |
|---|---|---|
| WO | 95/17692 A1 | 6/1995 |
| WO | WO 95-17303 | 6/1995 |
| WO | WO 99-36258 | 7/1999 |
| WO | WO 99-36809 | 7/1999 |
| WO | WO 99-39224 | 8/1999 |
| WO | WO 02-096621 | 12/2002 |
| WO | WO 2008-144136 | 11/2008 |
| WO | WO 2008-144644 | 11/2008 |
| WO | WO 2008-144656 | 11/2008 |
| WO | WO 2009-123928 | 10/2009 |
| WO | WO 2010-059566 | 5/2010 |
| WO | WO 2010-059568 | 5/2010 |
| WO | WO 2010-059579 | 5/2010 |
| WO | WO 2011-062822 | 5/2011 |

OTHER PUBLICATIONS

Gendron, "Foaming Poly(methyl Methacrylate) with an Equilibrium Mixture of Carbon Dioxide and Isopropanol", Journal of Cellular Plastics, Mar. 2004, vol. 40, No. 2, pp. 111-130.
Weber, "Giant Birefringent Optics in Multilayer Polymer Mirrors", Science, Mar. 31, 2000, vol. 287, pp. 2451-2456. (XP000990141).
Intl Search Report for PCT/US2009/064616, 6 pages.
Written Opinion for PCT/US2009/064616, 13 pages.
Intl Search Report for PCT/US2009/064628, 3 pages.
Written Opinion for PCT/US2009/064628, 7 pages.
Intl Search Report for PCT/US2009/064674, 8 pages.
Written Opinion for PCT/US2009/064674, 13 pages.
Intl Search Report for PCT/US2009/064770, 3 pages.
Written Opinion for PCT/US2009/064770, 7 pages.
China Search Report, mailed on Jun. 3, 2013, 1 p.

* cited by examiner

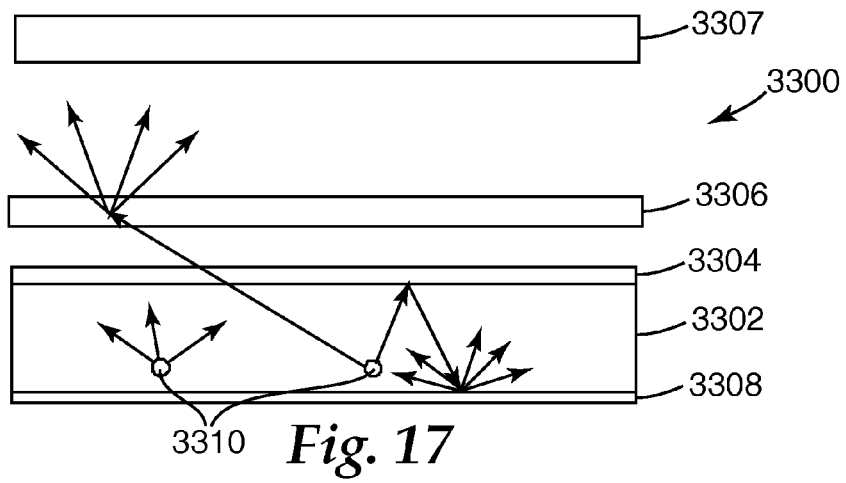
Fig. 17
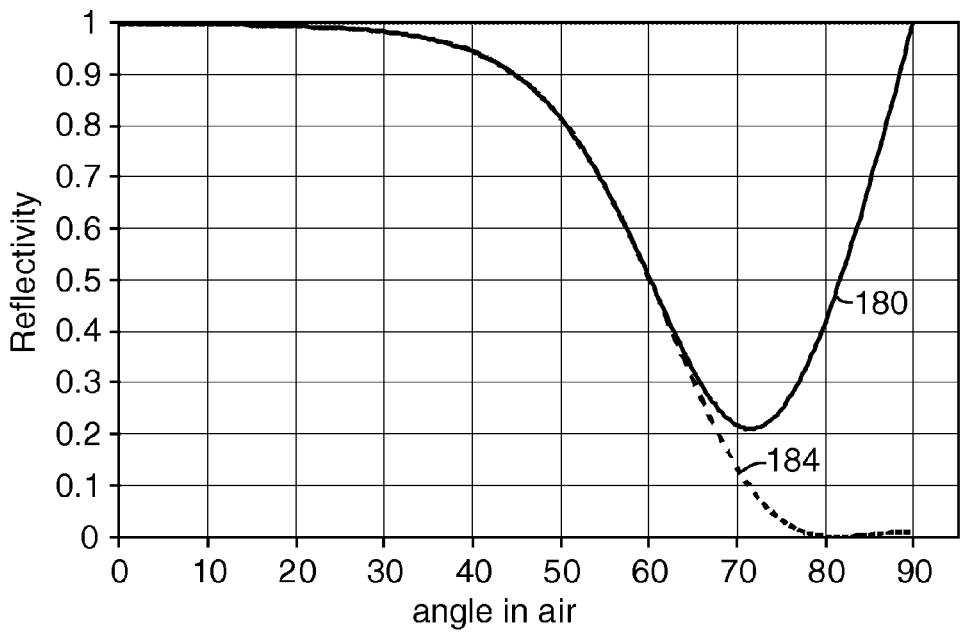
Fig. 18
Fig. 19

BREWSTER ANGLE FILM FOR LIGHT MANAGEMENT IN LUMINAIRES AND OTHER LIGHTING SYSTEMS

CROSS REFERENCE TO RELATED APPLICATIONS

This application is a national stage filing under 35 U.S.C. 371 of PCT/US2009/064770, filed on Nov. 17, 2009, which claims priority to U.S. Provisional Application No. 61/116,295, filed on Nov. 19, 2008, the disclosure of which is incorporated by reference in its/their entirety herein.

FIELD OF THE INVENTION

The present invention relates to multilayer optical films, whose reflectivity characteristics are determined in large part by constructive and destructive interference from interfaces between microlayers within the film, and also to lighting systems in which such films can be used, as well as to related methods, systems, and articles. The lighting systems can include backlights, such as those used in liquid crystal display (LCD) devices and similar displays, including backlights of either the direct-lit or edge-lit variety, but are not limited thereto. Also specifically included are lighting systems other than backlights used in displays, such as lighting systems intended for illumination without the need for any graphic component, including luminaires, task lights, and the like.

BACKGROUND

Recent years have seen tremendous growth in the number and variety of display devices available to the public. Computers (whether desktop, laptop, or notebook), personal digital assistants (PDAs), mobile phones, and thin LCD TVs are but a few examples. Although some of these devices can use ordinary ambient light to view the display, most include a backlight to make the display visible.

Many such backlights fall into the categories of "edge lit" or "direct lit". These categories differ in the placement of the light sources relative to the output face of the backlight, where the output face defines the viewable area of the display device. In edge lit backlights, a light source is disposed along an outer border of the backlight construction, outside the area or zone corresponding to the output face. The light source typically emits light into a light guide, which has length and width dimensions on the order of the output face and from which light is extracted to illuminate the output face. In direct lit backlights, an array of light sources is disposed directly behind the output face, and a diffuser is placed in front of the light sources to provide a more uniform light output. Some direct lit backlights also incorporate an edge-mounted light source, and are thus capable of both direct lit and edge lit operation.

BRIEF SUMMARY

In one embodiment, an optical assembly includes a reflector having an internal Brewster angle and a reflective polarizer having orthogonal reflection and transmission axes.

In another embodiment, a direct lit backlight assembly includes one or more lamps, a reflector having an internal Brewster angle, where a major surface of the reflector is facing at least one of the one or more lamps, and a light redirecting layer.

In yet another embodiment of the invention, an optical assembly includes one or more lamps, a display panel, and a reflector having an internal Brewster angle. The reflector is a multilayer interference film of at least three layers, where at least one of the layers is birefringent and a refractive index in the x-direction ($n_x$) is less than a refractive index in the z-direction ($n_z$), where the x-direction is an in-plane direction. The reflector is located between the lamps and the display panel.

In another embodiment, an optical assembly includes a backlight reflector having a smooth side, wherein the reflector has an internal Brewster angle of less than 90 degrees in air, wherein the internal reflectivity inside the film for one polarization is zero for a certain angle. The reflector has a reflectance of 50% or greater at normal incidence.

Multilayer optical films are disclosed that exhibit high reflectivity at normal incidence for all polarizations but preferentially transmit high angle rays in one or two orthogonal planes of incidence. Both symmetrical and asymmetrical constructions are disclosed. The films can be used in direct-lit backlights and in lighting systems other than direct-lit backlights, such as edge-lit backlights, and non-backlight lighting systems such as systems intended for general illumination without the need for any graphic component, such as luminaires and task lights.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements.

FIG. 17 is a cross-sectional view of another embodiment of a direct lit backlight assembly.

FIG. 18 is a schematic view of an embodiment of a reflector.

FIG. 19 is a graph of reflectivity versus angle for the air interface of an embodiment of an sPS/Silicone reflector of FIG. 18.

DETAILED DESCRIPTION OF ILLUSTRATIVE EMBODIMENTS

The present invention is applicable to optical assemblies for use with direct-lit backlights that exhibit a lower transmission for light of normal incidence as compared to the transmission of light at higher angles of incidence. In practice this means that a lower percentage of light is transmitted through an optical assembly in the region near a light source where the intensity is the highest, compared to regions further from the light source where the intensity is lower but which have a higher percent transmission. The net effect is a leveling of the transmitted light intensity across the face of the direct-lit backlight. As a result, a viewer is less likely to perceive a brighter area directly above a light source on a direct-lit backlight. Optical assemblies of this type are particularly useful in the context of direct-lit display devices, such as LCD display devices, including large area LCD TV's or desktop monitors.

A reflector can provide the desired transmission characteristics to level out the light output if it has an internal Brewster angle, so that the reflector has a reflectivity for p-polarized light that decreases as an angle of incidence increases, as will be explained in greater detail herein. The materials and structure of the reflector can be carefully chosen so that it has an appropriately high value for reflectivity at and near normal incidence, but light rays at higher angles of incidence are more likely to be transmitted. As a result, only a fairly small portion of the light emitted by light sources of a direct-lit backlight will be passed through the display in the area directly above the light source. At areas of the display not directly above the light sources, a higher proportion of light passes through.

Figure 1:
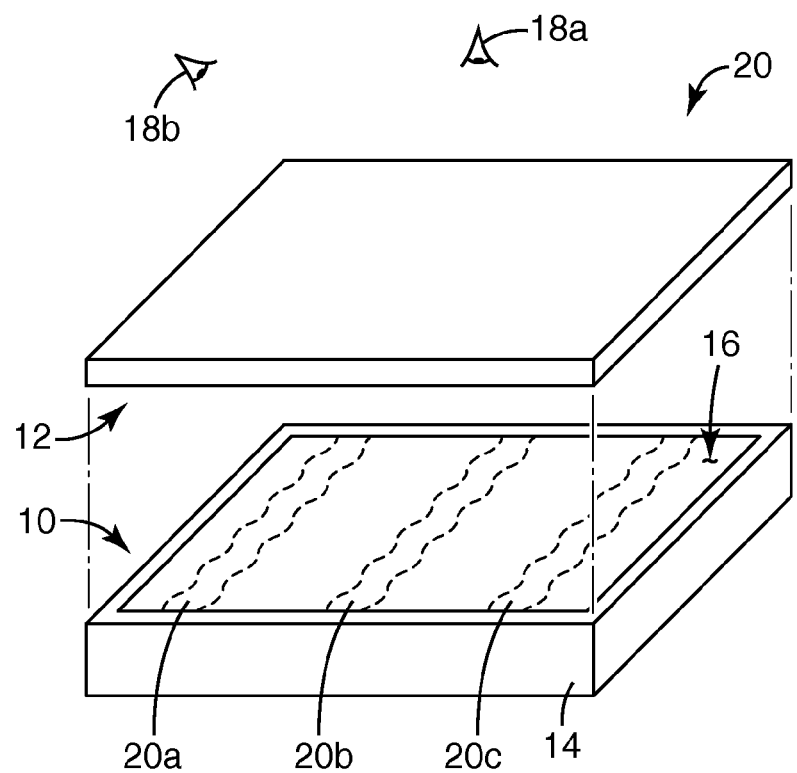
FIG. 1 is a perspective exploded view of a direct lit backlight in combination with a liquid crystal display.

The general structure of a direct-lit backlight will now be described. FIG. 1 illustrates in perspective exploded view of an optical assembly 20 that includes a direct lit backlight 10 in combination with a display panel 12, such as a liquid crystal display (LCD) panel. Both backlight 10 and display panel 12 are shown in a simplified box-like form, but the reader will understand that each contains additional detail. Backlight 10 includes a frame 14 and an extended output face 16. In operation, the entire output face 16 is illuminated by light source(s) disposed within the frame 14 behind the output face. When illuminated, the backlight 10 makes visible for a variety of observers 18a, 18b an image or graphic provided by display panel 12. The image or graphic is produced by an array of typically thousands or millions of individual picture elements (pixels), which array substantially fills the lateral extent (length and width) of the display panel 12. In most embodiments, the backlight 14 emits white light and the pixel array is organized in groups of multicolored pixels (such as red/green/blue (RGB) pixels, red/green/blue/white (RGBW) pixels, and the like) so that the displayed image is polychromatic. In some cases, however, it may be desirable to provide a monochrome display. In those cases the backlight 10 can include filters or specific light sources that emit predominantly in one visible wavelength or color.

Alternatively, the light sources can be sequentially powered sources of multiple monochrome light emitting devices, such as red, green and blue LEDs.

Backlight 10 in FIG. 1 is depicted as including three elongated light sources disposed behind the output face 16 as indicated by source zones 20a, 20b, and 20c. Areas of the output face 16 between or otherwise outside of the source zones are referred to herein as gap zones. The output face 16 can therefore be considered as being made up of a complementary set of source zones and gap zones. The existence of source zones and gap zones are a consequence of the fact that the light sources, even if they are extended, are both individually and collectively much smaller in projected area (plan view) than the output face of the backlight. In most embodiments, in order to provide optimum image quality from the display, it is desirable to configure the backlight 10 such that the brightness at the output face 16 is as uniform as possible. In those cases, the brightness in the source zones should be substantially the same as the brightness in the gap zones.

Figure 2:
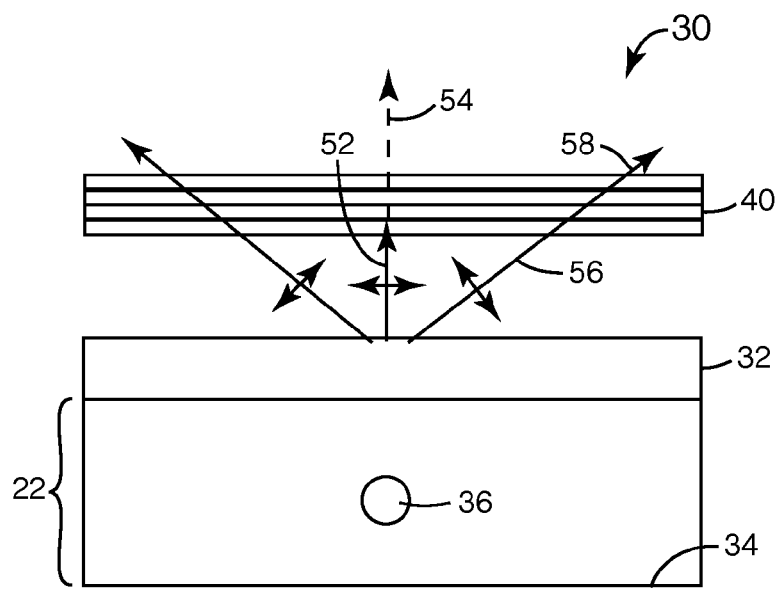
FIG. 2 is a schematic cross-sectional view of first embodiment of a direct lit backlight assembly.

FIG. 2 is a schematic sectional view of a direct lit backlight 30 capable of achieving such uniformity. Backlight 30 includes a front reflective polarizer 32, a back reflector 34, and a lamp 36. Reflective polarizer 32 and back reflector 34 form a light recycling cavity 22, within which light can undergo successive reflections. The reflective polarizer transmits light of a first polarization state, and reflects light of a second polarization state orthogonal to the first polarization state, where the two states are substantially plane-polarized along orthogonal (90 degree) in-plane directions. Cholesteric reflective polarizers, when combined with a quarter-wave retarder, can perform this function and are useful in this invention, as are wire grid reflective polarizers and diffuse reflective polarizers such as the DRPF (diffusely reflective polarizing film) products available from 3M Company.

In general, any reflective polarizer that reflects light having its plane of polarization parallel to one axis and transmits light having its plane of polarization parallel to an orthogonal axis is suitable for use with this invention. Conventional planar multilayer films that reflect s-polarized light and substantially transmit p-polarized light are not an option for this polarizer. Instead such films are useful as reflector 40, as discussed below. The proper combination of the two is useful for providing a uniform spatial intensity in backlights having light sources with linear portions such as fluorescent lamps.

FIG. 2 also includes a reflector 40 having an internal Brewster angle, such as an isotropic layered structure. The term internal Brewster angle refers to a Brewster angle at an interface that is internal to the reflector and not at an interface with air or other components in the system. One purpose of the reflective polarizer 32 is to deliver, to the reflector 40, predominantly p-polarized light in a plane of incidence perpendicular to a linear light source. Reflector 40 has a reflectivity for p-polarized light that decreases as an angle of incidence increases. The reflective polarizer is also useful for prepolarizing the light in displays that utilize absorbing polarizers. For example, a multilayer birefringent polarizer, such as for example a dual brightness enhancement film (DBEF) product available from 3M Company under the Vikuiti brand, can deliver p-polarized light to the reflector in the plane perpendicular to an axis of a light source. The order of placement can be changed such that the positions of the reflector 40 and the reflective polarizer 32 can be interchanged without loss of functionality if the losses in both components are small.

At low angles of incidence, the reflectivity of the reflector 40 is high for p-polarized light, so that only a small portion of light with a low angle of incidence is propagated all the way through the reflector 40. For example, light ray 52 in FIG. 2 is normal to the surface of the reflector 40, therefore having a zero degree angle of incidence. As a result, only a small portion of the incident light 52 emerges from the reflector as light ray 54. At higher angles of incidence, the reflectivity of the reflector 40 is lower for p-polarized light, so that a larger portion of light is propagated all the way through the reflector 40. For example, light ray 56 is incident upon the reflector at a higher angle of incidence, so a larger portion emerges from the reflector as light ray 58.

In most embodiments of the invention, the reflective polarizer 32 does not have an internal Brewster angle though in other embodiments the reflective polarizer does have an internal Brewster angle. If reflective polarizer 32 is a multilayer birefringent reflective polarizer it may possess an internal Brewster angle along the pass axis, which is substantially transmissive, even at normal incidence. It may even possess an internal Brewster angle along the block (reflective) axis, provided it substantially reflects light parallel to that axis for both s- and p-polarized light at all angles of incidence. In some embodiments, the reflective polarizer does not have an internal Brewster angle in the plane of incidence that is parallel to a block axis of the reflective polarizer.

It is also possible for an optical assembly of the present invention to be constructed without a reflective polarizer. For example, a backlight constructed with omni directional point sources of light, such as, for example, LEDs, may not require a directional source of p-polarized light to the reflector 40, because there is no directional aspect to the emission of light. FIG. 17 provides an example of such an optical assembly. FIG. 17 illustrates backlight 3300, which includes a light cavity 3302, a reflector with an internal Brewster angle 3304, a diffuser 3306 and an optical light directing film 3307. The light cavity 3302 includes a diffuse mirror 3308, and a number of point, serpentine or line light sources 3310. Although a uniform backlight can be constructed without the use of a reflective polarizer, a reflective polarizer may still be desirable for prepolarizing and recycling polarized light in displays that utilize absorbing polarizers. There are also displays that do not require polarized light, such as backlit signage.

Examples and Characterizations of Direct-Lit Backlights

Figure 3:
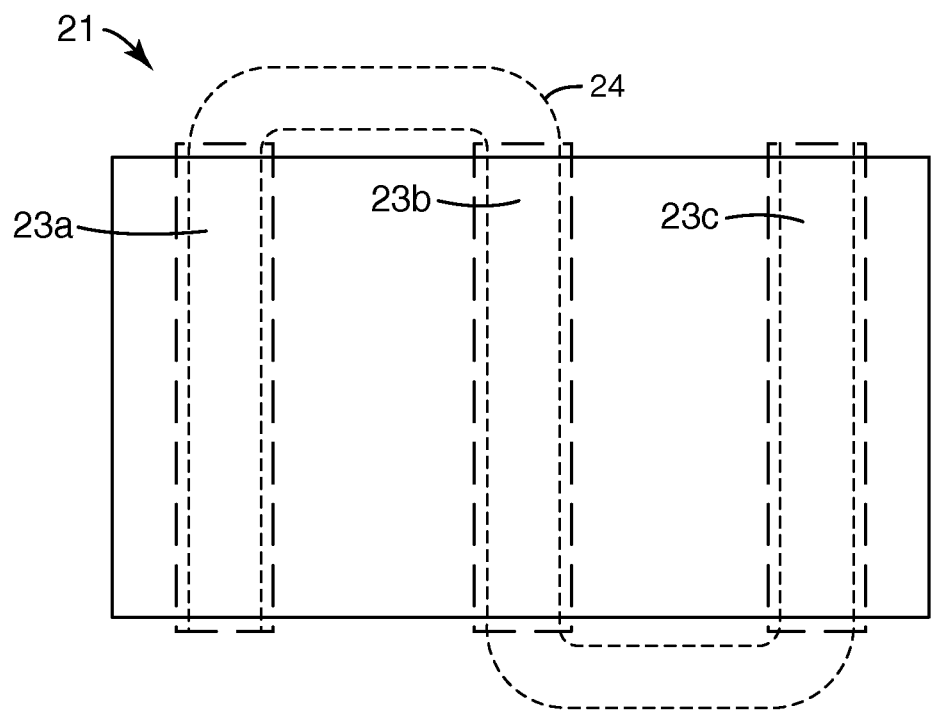
FIG. 3 is a plan view of one embodiment of a direct lit backlight.

As discussed above, the backlight configuration of FIG. 2 helps to hide a lamp in a direct-lit backlight by making the output of the backlight more uniform across its surface. Other backlight configurations that help to hide a lamp will also be described further herein. But first, more general types of direct-lit backlights will be discussed including backlights using line sources, serpentine sources and point sources. Direct-lit backlight 10 in FIG. 1 illustrates three sources 20*a-c*. These sources are three individual discrete linear lamps in one embodiment, commonly known as line sources. Turning now to FIG. 3, a plan view of another exemplary backlight 21 is illustrated where light sources 23*a-c* are portions of a larger serpentine lamp 24.

Figure 4:
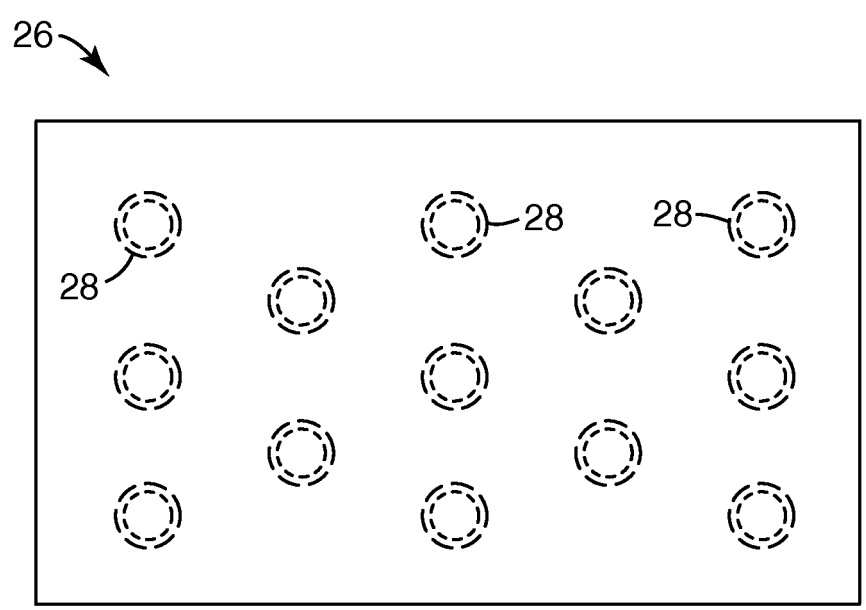
FIG. 4 is a plan view of an embodiment of a direct lit backlight that utilizes compact light sources such as LEDs.

FIG. 4 shows a plan view of an alternative backlight 26 including an array of compact or small area light sources 28. These sources may be, for example, LED sources. Examples of LED-based light sources are described in the following commonly-assigned patent applications: U.S. Patent Application Publication US 2004/0150997 A1 (Ouderkirk et al.), U.S. Patent Application Publication US 2005/0001537 A1 (West et al.), and U.S. patent application Ser. No. 10/977,582, "Polarized LED", filed Oct. 29, 2004.

Common types of direct-lit backlights are line, serpentine or point sources. The lamps in direct-lit backlights are directly behind the output face of the backlight, rather than along an outer border of a backlight construction. A direct-lit backlight is one where the locations where photons are created or originated, such as lamps, are substantially within a projected area of the display area. For example, a direct-lit backlight 10 includes a display area, such as display area 16 in FIG. 2. The lamp 36 is within the projected area of the display area 16. Similarly, lamp 36 is within the projected area of a major surface of the reflector 40. Another way of describing a direct-lit backlight is one where a projected area of a display area is significantly larger than a projected area of a lamp or light source. In contrast to direct-lit backlights, side-lit backlights are typically configured with a lamp that is not within a projected area of a display area. Instead, in a side-lit backlight, a lamp runs along an edge of the display area and off to the side.

Uniform vs. Unmodified Light Output for a Direct-Lit Backlight

Figure 5:
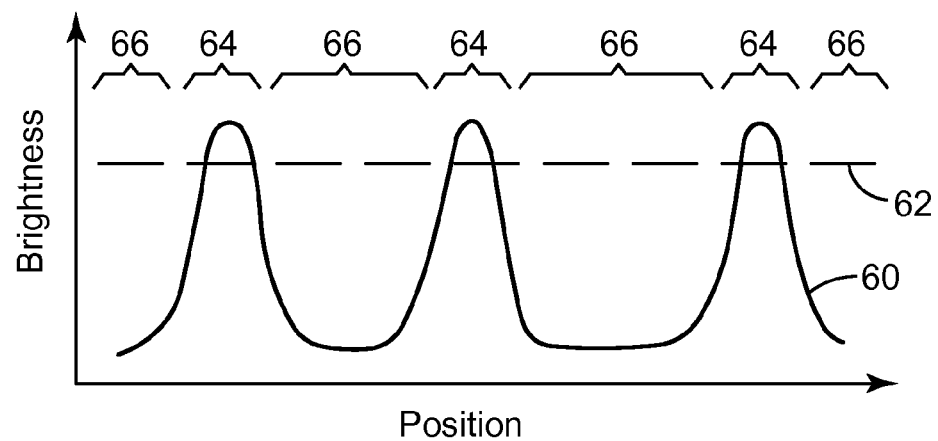
FIG. 5 is an idealized graph showing brightness versus position on at least a portion of the output face of a backlight.

FIG. 5 is an idealized plot of brightness of the backlight along a path that extends across all or a portion of the backlight's output surface. The path is selected to include zones of the output surface immediately above the light sources, i.e., source zones 64, as well as zones of the output surface not immediately above any light source, i.e., gap zones 66. For curve 60, the reflector 40 is not present in the device to selectively reflect light. Thus, the source zones 64 become relatively bright spots between relatively dark gap zones 66.

Curve 62 shows an idealized output for a backlight where steps are taken according to the invention to level the light intensity across the surface of the backlight, such as including a reflector 40 with a Brewster angle in the device. In that case, light transmitted through the reflective polarizer 32 at low angles of incidence are largely reflected by the reflector 40 and are transmitted to only a small degree. In that special case, light transmitted through the reflective polarizer towards the front of the display is reflected from and transmitted by the reflector 40 in amounts that cause the source zones 64 to have a brightness that substantially matches that of the gap zones 66. In this way, highly uniform illumination in a high brightness direct lit backlight can be achieved. Since perfect uniformity is rarely achievable for real systems, the characteristics of the device can be adjusted to minimize brightness variability over all or some portion of the output surface of the backlight.

Examples of a Reflector Having an Internal Brewster Angle

The term reflector refers to a structure having a reflectance of at least about 30%. In various embodiments, the reflector will have a reflectance of at least about 50%, 80% or 90%. Unless otherwise stated, all reflectance values refer to reflectance at normal incidence.

Figure 6:
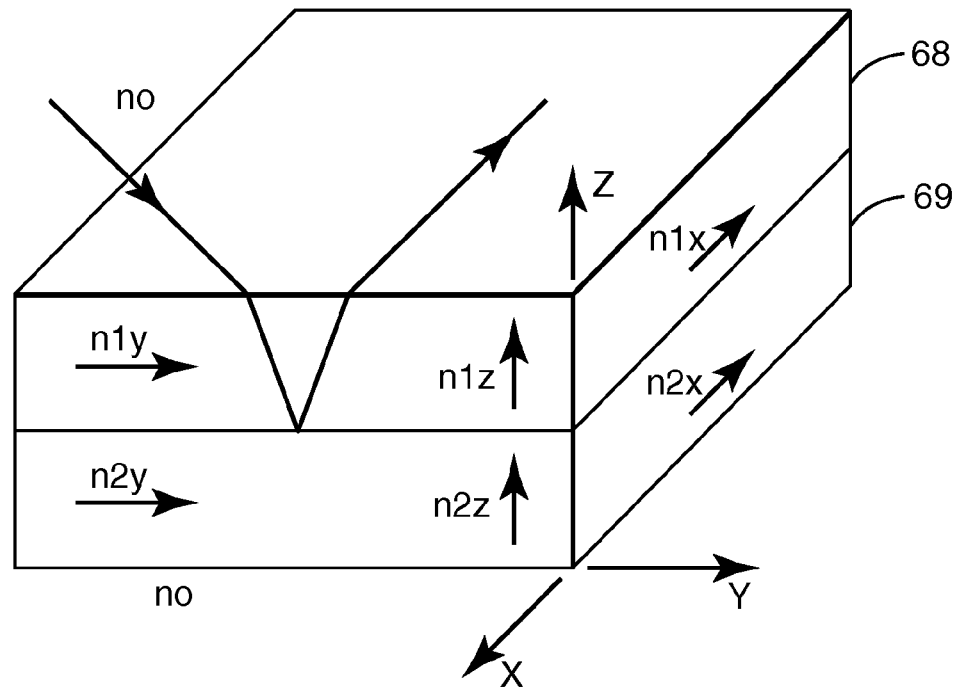
FIG. 6 shows a two layer stack of films forming a single interface, with notations showing how various indices of refraction will be labeled.

For light incident on a plane boundary between two regions having different refractive indices, a Brewster angle is the angle of incidence at which the reflectance is zero for light that has its electrical field vector in the plane defined by the direction of propagation and the normal to the surface. In other words, for light incident on a plane boundary between two regions having different refractive indices, a Brewster angle is the angle of incidence at which the reflectance is zero for p-polarized light. For propagation from a first isotropic medium, having a refractive index of $n_1$, to a second isotropic medium, having a refractive index of $n_2$, Brewster's angle is given as arc tan $(n_2/n_1)$. An internal Brewster angle can be present in an optical structure when there is an interface within the structure between adjacent portions having two different indices of refraction. An interference film, including material of alternating low and high index of refraction, can have an internal Brewster angle. However, an optical assembly with multiple layers does not necessarily have an internal Brewster angle. For example, if one or both of the alternating layers in a multilayer mirror are birefringent, and the z-indices of refraction of the layers have certain differential values relative to the in-plane indices, then no Brewster angle will exist. Alternatively, with another set of relative $n_z$ difference values, the value of the Brewster angle can be dramatically reduced. To help illustrate this behavior, two birefringent material layers forming an interface are shown in FIG. 6, with notations showing the labels for the indices of refraction for a first material 68 and a second material 69. Each material layer in general can have different indices in the x, y, and z directions as shown in FIG. 6.

The Brewster angle $\theta_B$ at an interface of two dielectric material layers, for light polarized in the y-z plane, is given by:

$$\sin^2\theta_B = \frac{n_{2z}^2 n_{1z}^2(n_{1y}^2 - n_{2y}^2)}{n_0^2(n_{1z}^2 n_{1y}^2 - n_{2z}^2 n_{2y}^2)}$$

Figure 7:
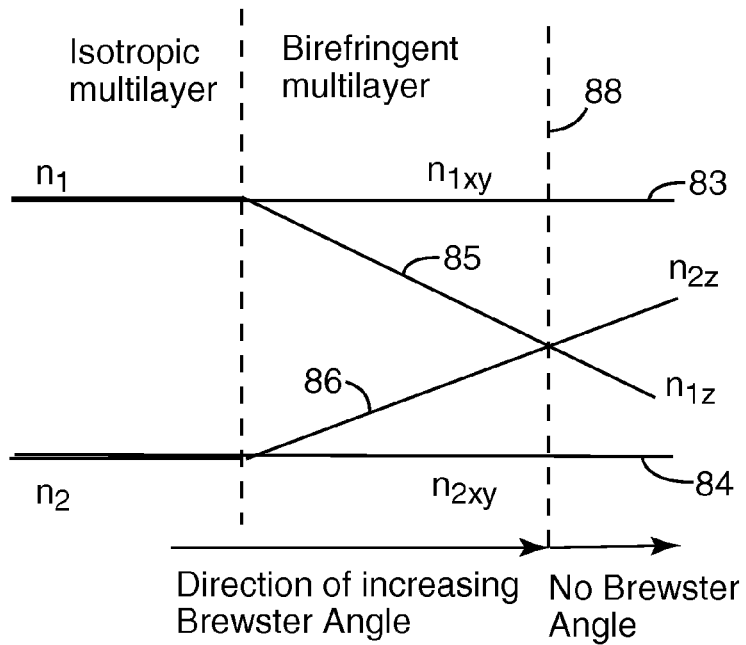
FIG. 7 is a schematic view of conditions for various indices of refraction in a multilayer construction and how they increase or eliminate an internal Brewster angle of the construction.

For light incident in the x-z plane, the values for $n_y$ in this equation are replaced by those of $n_x$. The relative values of $n_x$, $n_y$, and $n_z$ can dramatically affect the value and existence of the internal Brewster angle. Although there are a continuum of possibilities, the general effects fall into two main categories which can be summarized by the diagrams in FIGS. 7 and 8. FIG. 7 illustrates the optical material combinations which increase the value of the internal Brewster angle beyond those obtainable with isotropic materials, or eliminate the internal Brewster angle. This set of conditions is one where the difference in $n_z$ between the first material 68 and the second material 69 is less than the difference of the in-plane indices for the given plane of incidence. Lines 83 and 84 represent the values of $n_x$ or $n_y$ for the first and second materials, respectively, where the difference between $n_{1x}$ and $n_{2x}$ is shown staying constant, and the difference between $n_{1y}$ and $n_{2y}$ is shown staying constant. Lines 85 and 86 represent the values of $n_{1z}$ and $n_{2z}$, demonstrating that as the difference between $n_{1z}$ and $n_{2z}$ decreases, the internal Brewster angle increases. At line 88, which is the intersection between lines 85 and 86 where the $n_z$ difference vanishes, the Brewster angle also vanishes. Increasing $\Delta n_z$ past this point is of an opposite sign compared to the $\Delta n_{xy}$ and the reflectivity of p-polarized light now increases with the angle of incidence, similar to the reflectance for s-polarized light. One or both of the materials can be birefringent, but the same relations hold, regardless of which material is birefringent.

Figure 8:
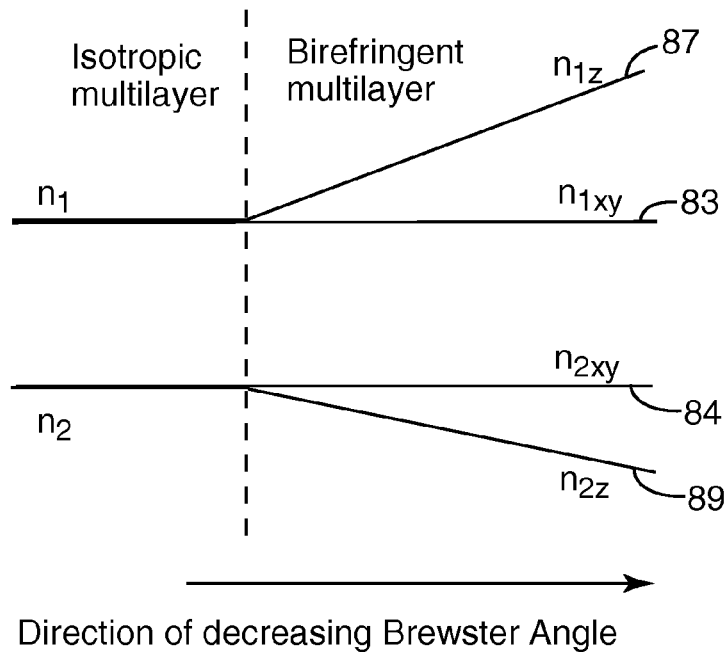
FIG. 8 is another schematic view of conditions for various indices of refraction in a multilayer construction and how they decrease or eliminate an internal Brewster angle of the construction.

FIG. 8 illustrates the preferred optical material combinations for the present invention which allow the construction of reflectors which can transmit substantial portions of p-polarized light at angles of incidence from air to a planar surface. With the proper index sets these reflectors can exhibit an enhanced Brewster effect such that the Brewster angle can be accessed with light incident from air on planar interfaces. This is not possible for most multilayer reflectors made with isotropic materials. However, the proper choice of birefringent materials can result in a larger difference for $n_z$ between first material layers 68 and second material layer 69 (FIG. 6) than for the in-plane index difference of the same layers:

$$\Delta n_z = (n_{1z} - n_{2z}) > (n_{1x} - n_{2x}) \text{ or } (n_{1z} - \Delta n_z) > (n_{1y} - n_{2y})$$

Like FIG. 7, FIG. 8 shows lines 83 and 84 representing the values of $n_x$ or $n_y$ for the first and second materials, respectively, where the difference between $n_{1x}$ and $n_{2x}$ is shown staying constant, and the difference between $n_{1y}$ and $n_{2y}$ is shown staying constant. Lines 87 and 88 represent the values of $n_{1z}$ and $n_{2z}$, demonstrating that as the difference between $n_{1z}$ and $n_{2z}$ is increasing beyond the difference between $n_{xy}$ values, the internal Brewster angle decreasing.

Figure 9:
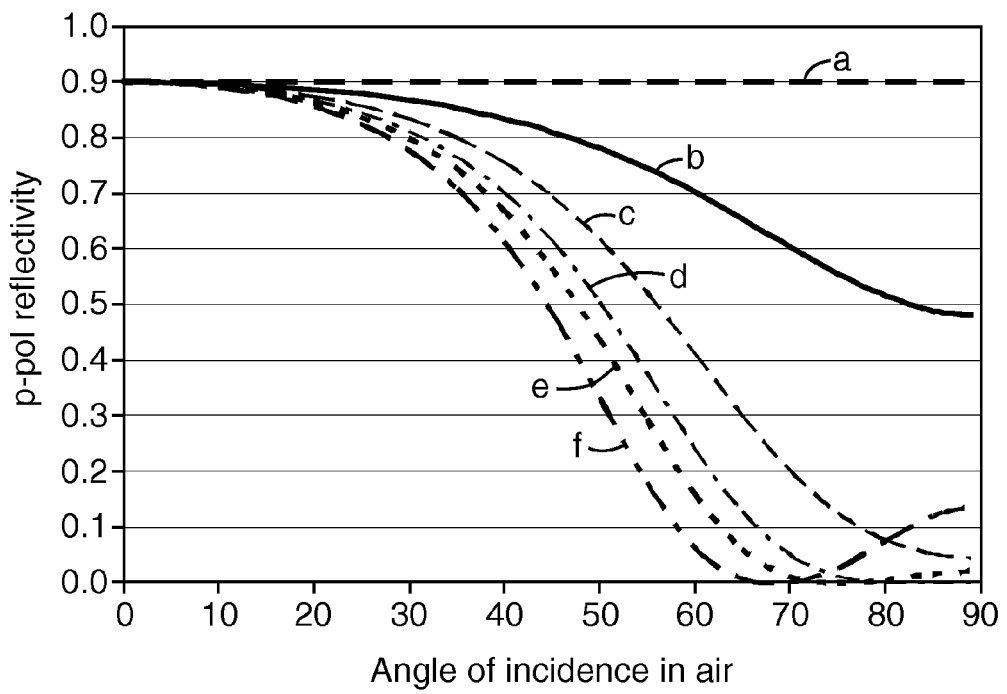
FIG. 9 is a graph of reflectivity versus angle for several multilayer birefringent reflectors that have internal Brewster angles accessible for light incident from air.

The larger the value of $\Delta n_z$ relative to $\Delta n_x$, the smaller the value of the Brewster angle for p-polarized light incident in the xz-plane on this interface, as illustrated in FIG. 9, which is further described herein. FIG. 9 was created for constant values of $n_x$ and $n_y$, with increasing values of $\Delta n_z$.

For any of these constructions, the existence of a Brewster angle is useful only if it exists for a substantial portion of the layers in a multilayer stack. If additional functional coatings or layers of a third or fourth material are added to the multilayer stack, these materials may create a different value of a Brewster angle with whatever material they are in contact with. If such materials have relatively few interfaces compared to the number of interfaces of first and second materials, such interfaces will not substantially impact the performance of the present invention. Where the multilayer stack includes mostly layers of first and second materials, but some layers are slight variations in the composition of first and second materials, the effect on the overall stack may be a broader Brewster angle minimum but the overall effect is similar to that with just two materials.

The desired performance of multilayer reflectors having an internal Brewster angle is one with relatively high reflectivity at normal incidence and a lower reflectivity (higher transmission) at oblique angles of incidence.

In general any multilayer reflector where $\Delta n_z$ between adjacent, alternating layers is of the same sign as $\Delta n_x$ or $\Delta n_y$, will exhibit an internal Brewster angle and is useful in this invention. In general the in-plane indices along the x- and y-axes need not be equal. There is a continuum between the uniaxial case where the x- and y-directions have identical indices, the biaxial case where $n_x \neq n_y \neq n_z$, and the uniaxial case where $n_x \neq n_y = n_z$.

Material Interfaces with Multiple Internal Brewster Angles

Figure 21:
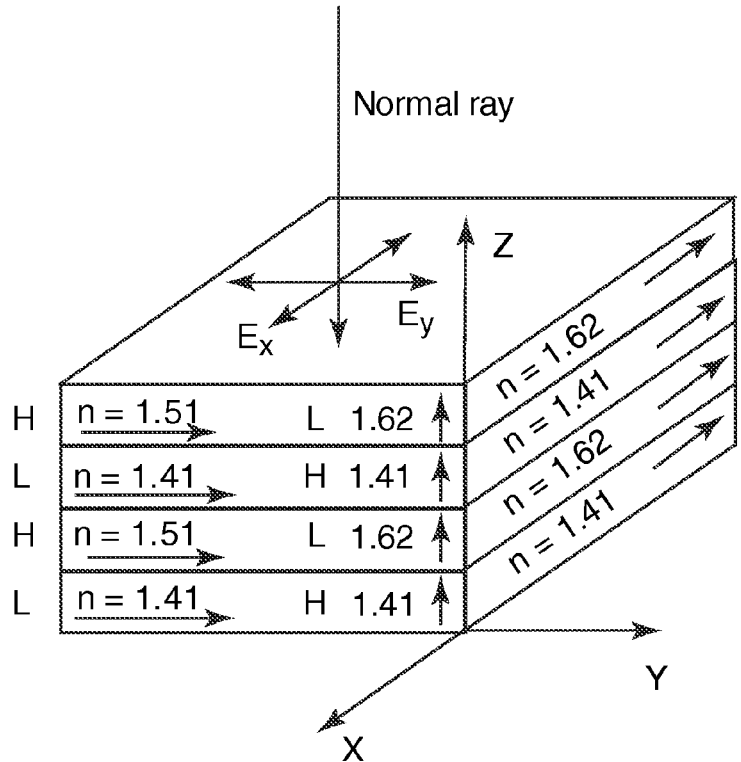
FIG. 21 is a schematic view of an embodiment of a reflector.

Birefringent multilayer reflectors can be made with oriented (stretched) birefringent polymeric materials. By using different stretch ratios in the x- and y-directions, an asymmetric reflector can be made which has very different values for the internal Brewster angle for those respective directions. A schematic index set is illustrated in FIG. 21. In accordance with the information presented in FIG. 8, a Brewster angle will exist for light incident in either the x-z or the y-z plane for the film pairing of FIG. 21. The z-index is of course the same for light incident in either the x-z or the y-z plane but since the $\Delta n_z/\Delta n_y$ ratio is larger than the $\Delta n_z/\Delta n_x$ ratio, the internal Brewster condition occurs at a smaller angle for the y-z plane than for the x-z plane. A continuum of internal Brewster angle values exist for the azimuthal angles between the x-z and the y-z planes. Thus, multilayer reflectors made with only two materials can exhibit different Brewster angles along different in-plane directions. For efficient hiding of light sources, a relatively high reflectivity at normal incidence may be desired along all in-plane directions. In some embodiments, the reflectivity is greater than about 50% along either axis. Examples with specific materials are given below.

If the reflectivity of such an asymmetric reflector is much higher for one axis than for the other, the reflector can perform the function of a reflective polarizer in polarizing light from the backlight as well as providing for a more spatially uniform light output from the backlight. In general, if it is to provide for polarization recycling, or "gain", then the ratio of transmission for the "pass" axis should be on the order of or greater than at least twice the transmission of the "block axis".

Referring back to FIG. 2, for systems that are illuminated with linear light sources or approximate linear arrays of point lights sources, the "block" axis of this asymmetric reflector is preferably aligned with this linear direction.

The reflector of this invention transmits predominately oblique rays of light and a light redirecting layer such as a diffuser, prismatic film, or beaded "gain diffuser" film or the like is used in some embodiments to provide light of normal incidence to the display and the viewer, as further discussed herein. If the reflector is to also function as a prepolarizer or polarization recycling film, the light redirecting layer should not substantially depolarize the light transmitted by the reflector. If a diffuser or light redirecting film substantially depolarizes the light, then a separate reflective polarizer may be added between the reflector and the display panel.

There are many possibilities for the structure of reflector 40 which will be further discussed herein. For example, the reflector 40 is a multilayer stack of isotropic materials in one embodiment. Further exemplary constructions of the reflector 40 will now be described.

Reflector is a Birefringent Layered Structure

Birefringent layered structures are described, for example, in U.S. Pat. No. 5,882,774. In general, the preferred multilayer reflector 40 is one wherein the z-axis index difference if greater than one or both of the x and y-axis index differences.

For certain embodiments of a biaxial birefringent layered structure used as a reflector, the reflectance along at least one in-plane axis is at least about 50% or at least about 60%.

When considering the Brewster angle, another important issue is whether an internal Brewster angle of an optical structure will be accessible in air. FIG. 9 illustrates the modeled reflectivity in air of multilayer stacks of birefringent and isotropic layers having in-plane indices of 1.57 and 1.41. The values for $n_{1z}$ range from 1.41 for plot a to 1.7 for plot f. As a result, the $\Delta n_z$ values range from 0 for plot a to 0.29 for plot f. A reflectance of 90% at normal incidence from 400 to 800 nm is achievable with about 400 alternating layers of two materials having these in-plane indices. The reflectivity values shown in FIG. 9 do not include surface reflections, that is, the contribution from the air-polymer interfaces are not included in the calculations. The larger $\Delta n_z$ is, compared to $\Delta n_x$, the lower the Brewster angle. Plot d is representative of a configuration where the internal Brewster angle is about 78° and $n_{1z}=1.62$, which is readily achievable by using sPS as the high index material and a silicone polyox-amide. The use of silicone polyox-amide is described in co-pending and co-owned patent application U.S. Appl. No. 60/753,857, filed Dec. 23, 2005. The Brewster angle can of course also be reduced by lowering the value of $n_{2z}$ relative to $n_{2x}$, i.e. by using a birefringent material of the appropriate sign for the low index layers.

Reflector has Disc-Shaped Voids

Figure 10:
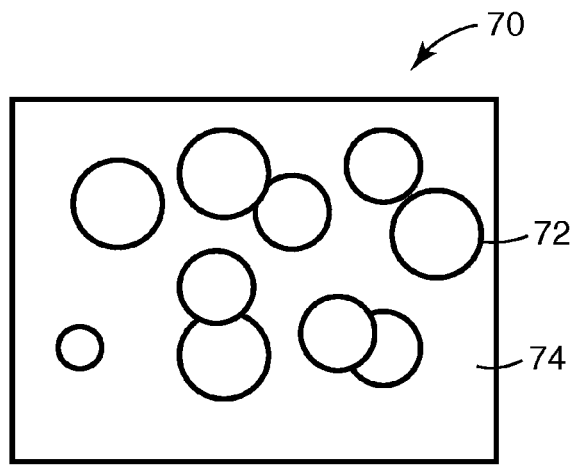
FIGS. 10 and 11 are top and side views, respectively, of a reflector having disc-shaped portions that is used in one embodiment of an optical assembly.
Figure 11:

In one exemplary embodiment illustrated in FIGS. 10 and 11, a reflector 70 is a discontinuous phase material that includes voids in the form of, for example, isotropic platelets or discs 72 in an isotropic medium 74. The advantage of the voided material is that the Brewster angle can be as low as about 50 degrees in air. Voids can be created in polymer films by the use of foaming agents during extrusion or molding, a process well known in the art.

Preferably, the material is isotropic and the voids have aspect ratios of diameter (D) to thickness (t) of about 3:1 or greater. The aspect ratios are more preferably about 10:1 or greater. In other embodiments, the void areas may have an oval profile. In order to achieve the Brewster angle effect in continuous media having a discontinuous or disperse phase, the disperse phase particle or void size is much larger than the wavelength of light and preferably have approximately planar surfaces such as oblate spheroids which approach the shape of flat discs.

In one embodiment, an isotropic voided material is made, for example, with foamed PMMA (Polymethyl methacrylate). See, for example "Foaming Polymethyl methacrylate with an Equilibrium Mixture of Carbon Dioxide and Isopropanol" by R. Gendron and P. Moulinie in Journal of Cellular Plastics March 2004, vol. 40, no. 2, pp. 111-130 (20). Cyclic olefins are another class of isotropic polymers that are voided to make an isotropic air/polymer mirror. In addition, cyclic olefins can typically be stretched at higher ratios than PMMA to give higher aspect ratios in the voids.

In an exemplary embodiment, the disc-shaped portions have a lower index of refraction than the surrounding material. In another embodiment, the disc-shaped portions have a higher index of refraction than the surrounding material.

A number of different constructions have been discussed for the reflector having an internal Brewster angle, and further constructions will now be described. In addition, it is important to note that different reflector constructions may be used with different backlight configurations, such as backlight configurations having various light extraction layers that are further discussed herein. The reflector is made with isotropic film layers in some embodiments, and with specially tailored birefringent layers in other embodiments. Additional reflector constructions will now be described.

Reflector is PEN and PMMA Layers

In one exemplary embodiment, the reflector 92 is a multilayer structure that includes 530 isotropic layers of PEN (polyethylene naphthalate) and PMMA. The individual layers range in thickness from about 500 nm to 2000 nm.

Reflector is PEN/THV Layers

In one embodiment, the reflector is a layered structure with layers alternating between oriented PEN and THV (a polymer of tetrafluoroethylene, hexa fluoropropylene and vinylidene fluoride, sold as 3M's Dyneon™ THV Fluorothermo-plastic material). In one embodiment, the oriented PEN layers have $n_x=n_y=1.75$ and $n_z=1.49$, while the THV layers have n=1.35. In other embodiments, the reflector is an oriented PET/THV mirror. In one example, the oriented PET (polyethylene teraphalate) layers have $n_x=n_y=1.65$ and $n_z=1.49$. These types of reflectors have internal Brewster angles (measured in the incident medium) of 54 degrees and 51 degrees respectively when immersed in acrylic (n=1.49). Reflectors of PEN/THV can be made with reflectivity of about 99% at normal incidence. In air however, the p-polarized reflections will decrease with angle from 99% at normal incidence to 90% at 90 degrees for PEN/THV and from 99% to 80% for PET/THV. Preferably, the PEN/THV type construction is used in combination with light injection and/or extraction components.

Reflector is sPS and PMMA Layers

Figure 15:
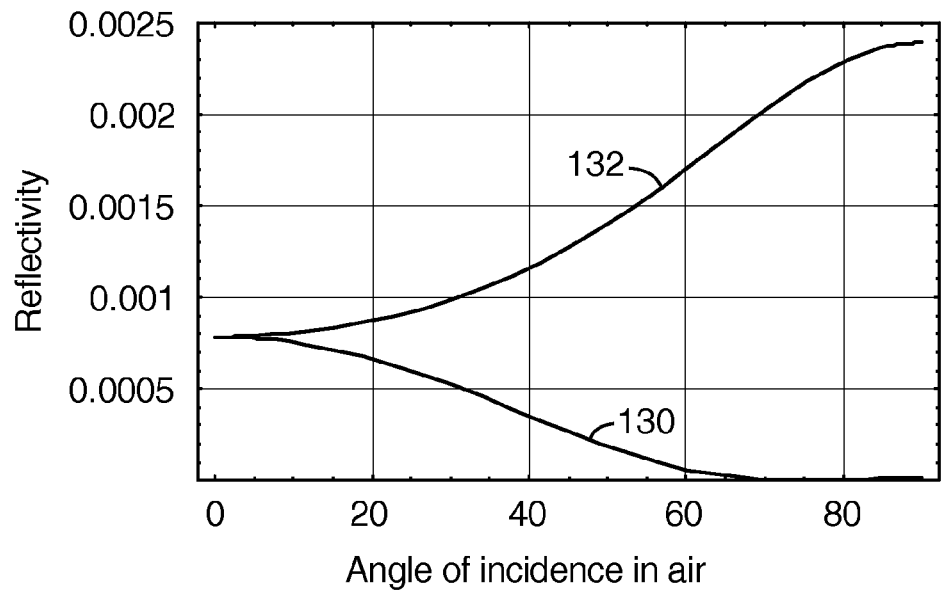
FIG. 15 is a graph of reflectivity versus angle for one interface of an sPS/PMMA reflector for s and p polarized light.

In another exemplary embodiment, a multilayer reflector can be made with alternating layers of syndiotactic polystyrene (sPS) and PMMA. The sPS material can be biaxially oriented to achieve in-plane (x-y) indices of approximately 1.57 (depending on wavelength) while the thickness- or z-index is approximately 1.62. Unless otherwise noted, all indices of refraction refer to values at a wavelength of 633 nm. The PMMA will remain substantially isotropic with an index of about 1.49 upon orientation of the multilayer reflector film. The angle dependency of reflectivity for a single interface of this sPS and PMMA for s- and p-polarized light, plotted against the angle of incidence upon the multilayer reflector film in air, is shown in FIG. 15. Curve 130 shows the reflectivity for p-polarized light while curve 132 shows the reflectivity for s-polarized light. A multilayer sPS/PMMA reflector can be designed to have any desired amount of reflectivity from about 10% to 90% at normal incidence. The reflectivity for p-polarized light will drop proportionately as the angle of incidence increases. Another exemplary embodiment of an sPS/PMMA reflector has about 80% reflectivity at normal incidence.

When a multilayer film of these materials is used in conjunction with a reflecting polarizer that blocks s-polarized light which has an E-field direction parallel to a line source of light, then only p-polarized light will strike the film in the plane perpendicular to the line source. In this manner, the total light transmitted in this plane will increase with angle of incidence, reaching a maximum at the internal Brewster angle, which in this case is about 74 degrees in air, as shown where curve 130 approaches zero reflectivity.

Figure 16:
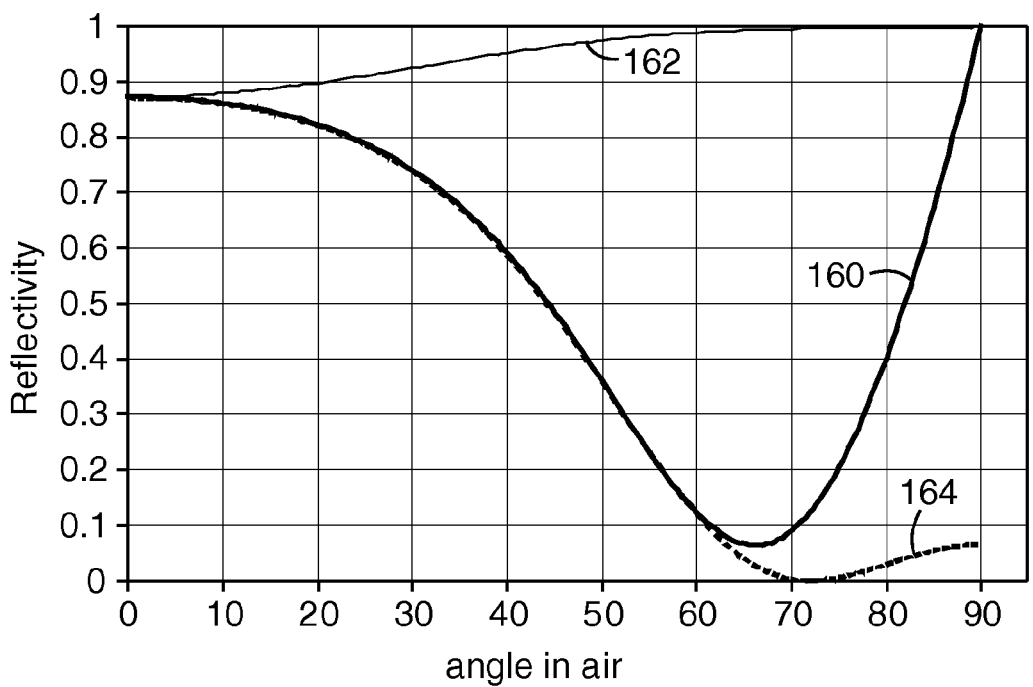
FIG. 16 is a graph of reflectivity versus angle for the air interface of another embodiment of an sPS/PMMA reflector.

FIG. 16 graphs a model of the angle dependency of reflectivity of a multilayer quarter-wave stack of sPS/PMMA for s- and p-polarized light having the same indices of refraction discussed above with respect to FIG. 15. Curve 160 shows the reflectivity for p-polarized light for the film stack, including the two air interfaces, curve 162 shows the reflectivity for s-polarized light, and curve 164 graphs the reflectivity for p-polarized light for the stack only with air interfaces removed. The difference between curves 160 and 164 illustrates the effects of the surface reflections, which generally have a different value for the Brewster angle and the reflection magnitude than do the internal interfaces of the film stack.

The Brewster angle of about 74 degrees when light is incident from air is illustrated by the minimum in the curve 164 of FIG. 16. The minimum of curve 160 illustrates the Brewster angle for the combination of internal and air interfaces.

The small index differential of sPS/PMMA multilayer reflector embodiments requires that a large number of layers be used to achieve high reflectivity over the visible spectrum. About 1500 layers are required to achieve the modeled reflectivity of 87% at normal incidence illustrated in FIG. 16.

Reflector is sPS and Silicone Polyamide Layers

Higher reflectivity with fewer layers can be achieved if one uses silicone polyamide as the low index material. One example for a structure for a reflector that has sPS and silicone polyamide layers and can achieve acceptable reflectivity is illustrated in FIG. 18, where the isotropic layers have a refractive index of 1.41, and the alternating layers have a z-index of 1.62 and an in-plane index of 1.57. Using about 1000 layers, a reflector can be made with a reflectivity over a spectrum of about 400 to 850 nanometers at normal incidence of about 99.5%. The reflectance vs. angle curves for such a mirror are shown in FIG. 19. Curve 180 shows the reflectivity for p-polarized light for a film stack in air and curve 184 graphs the reflectivity for p-polarized light for the stack with no air interfaces. An acceptable mirror can also be made using only a few hundred layers.

The use of reflectors with Brewster angles accessible in air can provide improved bulb hiding, compared to reflectors made with all isotropic layers, while maintaining a high efficiency backlight. This is possible because such reflectors can be made to have up to or more than 99% reflectivity at normal incidence and still have essentially zero reflectivity at an angle less than 90 degrees in air. A number of embodiments of backlights incorporating these reflectors do not include a microstructure to inject or extract the light from such a reflector. A diffuser or light redirecting film is still present in many embodiments so as to provide a desired angular distribution of light to the display. For example, a randomizing diffuser is placed above the reflector, or a sheet of BEF is placed above the reflector along with an optional diffuser sheet having an optimized level of diffusion.

In other embodiments of the invention, isotropic multilayer reflectors are used, although the reflectivity does not decrease as rapidly with angle, unless the reflector is immersed. Immersion can be accomplished by applying a structured surface to the reflector. Lamination of a "gain diffuser" or other beaded or prismatic structures to the surface can accomplish this effect.

Asymmetric Reflector with Two Brewster Angles

With an asymmetric stretch of the appropriate multilayer stack, one in-plane axis of a reflector can have a much lower Brewster angle compared to its orthogonal in-plane axis. In this manner, at least one axis of the reflector can have an internal Brewster angle near 60 degrees in air. This value is close to the air/polymer Brewster angle. This is important because at high angles, the surface reflections dominate the light transmission through a film. These asymmetric reflectors can improve the efficiency of a backlight while still providing equal or better bulb hiding characteristics.

One example of a reflector having an internal Brewster angle that can be used with the backlight configurations described herein is made with stacks of negative birefringent polymer layers and alternating layers of either a low index isotropic polymer or a low index positive birefringent polymer. A negative birefringent polymer is defined as one whose index of refraction decreases in the stretch direction while one or both of the indices in the orthogonal directions simultaneously increases. A positive birefringent polymer is defined as one whose index of refraction increases in the stretch direction while one or both of the indices in the orthogonal directions simultaneously decreases.

The polymer stack is oriented in only one direction, or in general with any asymmetric stretch, creating an asymmetric reflector. When used in a backlight, this reflector can be combined with a diffuser and optionally with a standard reflective polarizer to aid in hiding bright point sources of light.

By using an asymmetric orientation, one axis can have high reflectivity and the other axis can be provided with an internal Brewster angle as low as 60 degrees in air with larger index differential materials. When combined with a standard multilayer reflective polarizer and diffuser, bright light sources can be effectively masked.

Reflector is Symmetrical Biaxially Oriented sPS/Silicone Polyamide Layers

Figure 20:
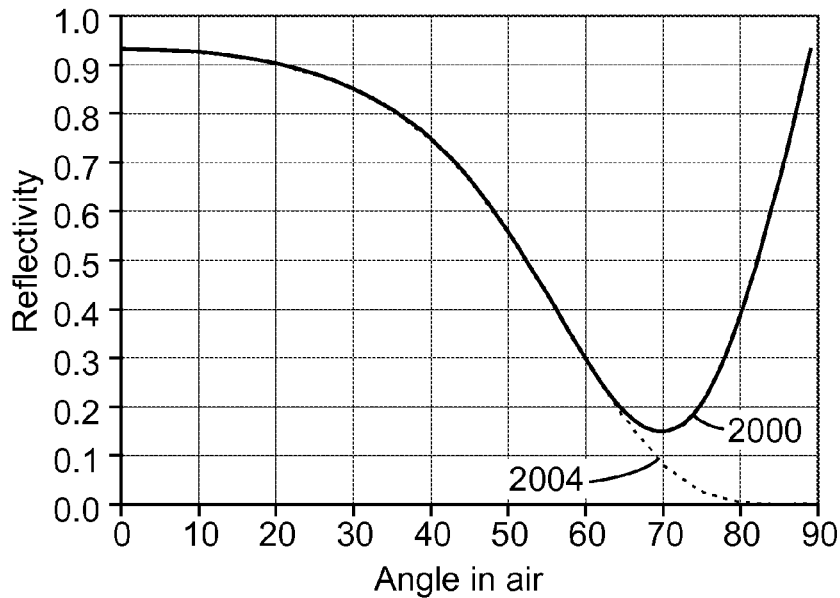
FIG. 20 is a graph of the reflectivity as a function of angle for an sPS/silicone polyamide reflector of FIG. 18.

One embodiment of a reflector having an internal Brewster angle is a symmetrically, biaxially oriented sPS/silicone polyamide reflector. Silicone polyamide has an index of 1.41, which is considerably lower than that of PMMA and can provide a reflector with high reflectivity while using a manageable number of layers. The indices of refraction for the two materials for this embodiment are the same as illustrated in FIG. 18. The isotropic layers have a refractive index of 1.41, and the alternating birefringent layers have a z-index of 1.62 and an in-plane index of 1.57. The indices of refraction are the same for both stretch directions in this case. As modeled, the reflectivity as a function of angle is shown in FIG. 20 for this reflector stack for a 400 layer stack which reflects light from 400 to 850 nm. Curve 2000 shows the reflectivity for p-polarized light for the multilayer stack and its air interfaces, and curve 2004 graphs the reflectivity for p-polarized light for the stack only with surface-air interface reflections removed. Peak reflectivity for p-polarized light is about 90% at zero degrees. The Brewster angle is at about 85 degrees and surface reflections cause the minimum for total reflectivity for p-polarized light to shift to about 70 degrees with about 15% minimum reflectance.

Uniaxially Oriented sPS/Silicone Polyamide Layers

One embodiment of an asymmetric reflector having two Brewster angles is a stack of uniaxially oriented sPS/silicone polyamide layers. In one example, the stack of this embodiment has about 210 layer pairs and reflectivity of 99% at zero degrees for light polarized along the non-stretch axis or strong axis. When a stack of sPS and SPA is uniaxially oriented as in a standard tenter, the stack index set illustrated in FIG. 21 can be obtained.

Figure 22:
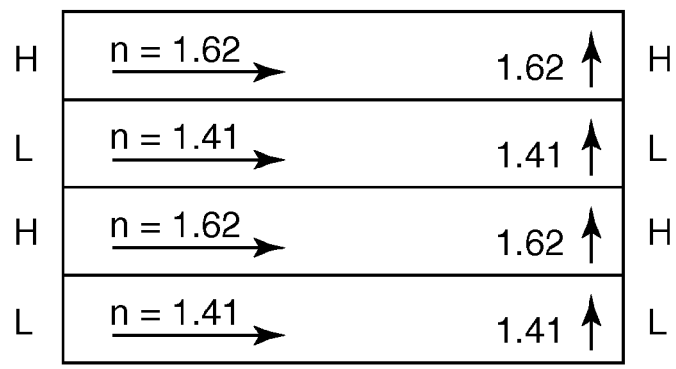
FIG. 22 is a schematic view of the strong axis of the reflector of FIG. 21.

The reflectivity of this reflector design has a weak and a strong axis. The strong axis, illustrated in FIG. 22, has a 0.21 index differential. The weak axis, illustrated in FIG. 24 has only a 0.10 index differential. The reflectivity is plotted against the angle in air for the strong axis in FIG. 23. Curve 2300 shows the reflectivity for p-polarized light for the stack with two air interfaces. Curve 2304 graphs the reflectivity for p-polarized light for the film stack with no air interfaces.

Figure 25:
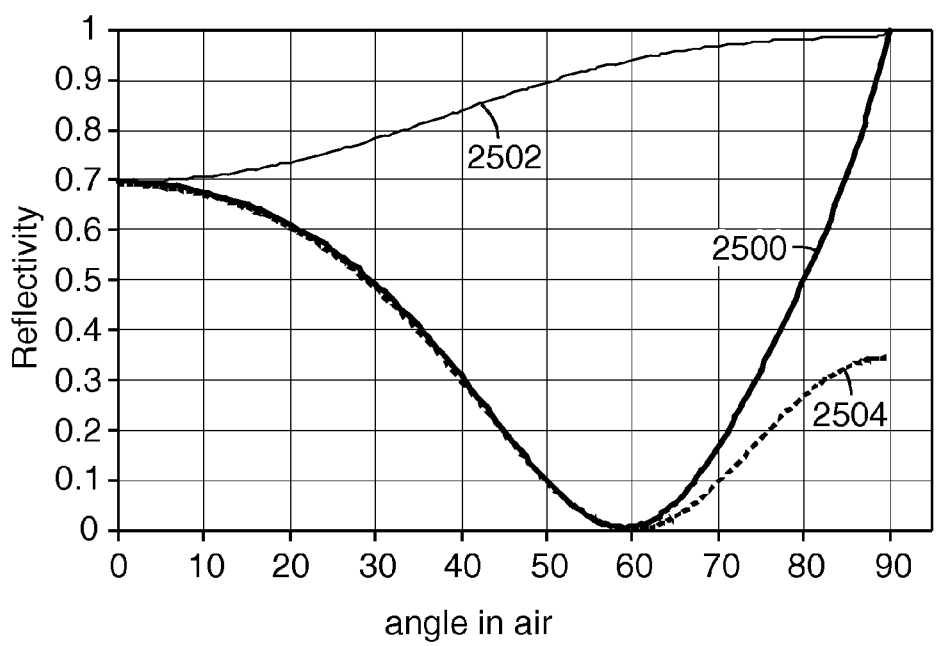
FIG. 25 is a graph of the reflectivity as a function of angle for the weak axis of the reflector of FIG. 21.

The reflectivity is plotted against the angle in air for the weak axis in FIG. 25. Curve 2500 shows the reflectivity for p-polarized light for the film stack with two air interfaces. Curve 2502 shows the reflectivity for s-polarized light, and curve 2504 graphs the reflectivity for p-polarized light for the stack without air interfaces.

Figure 23:
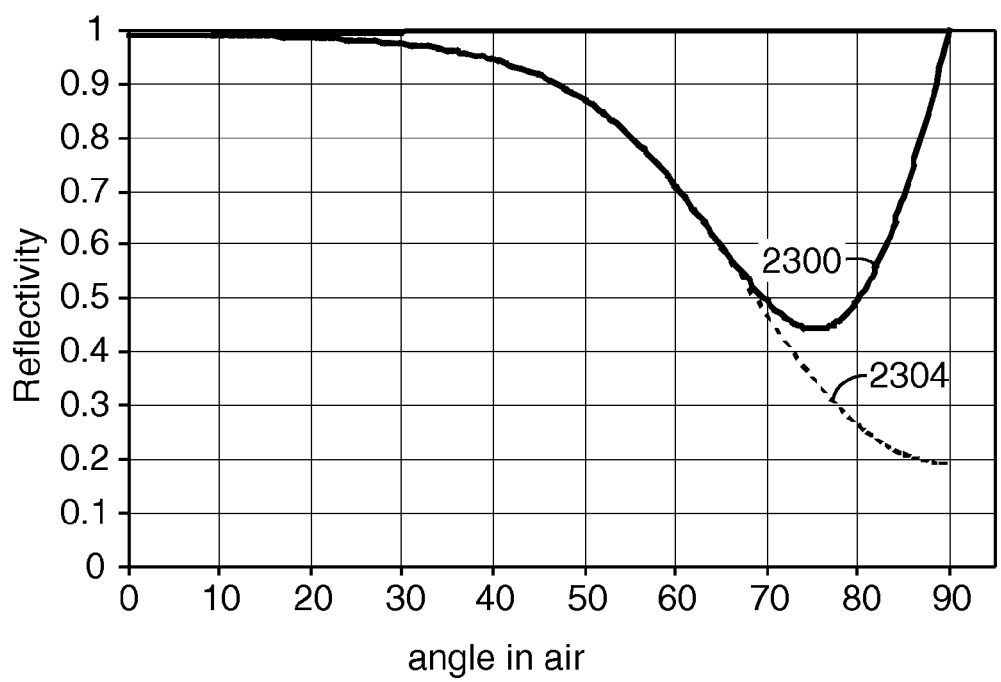
FIG. 23 is a graph of the reflectivity as a function of angle for the strong axis of the reflector of FIG. 21.
Figure 24:
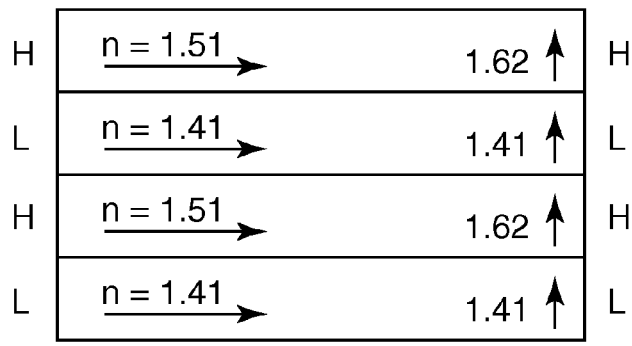
FIG. 24 is a schematic view of the weak axis of the reflector of FIG. 21.

Both axes have an internal Brewster angle, but as illustrated in FIGS. 23 and 25, the two Brewster angles are very different. The strong axis has an internal Brewster angle of greater than 90 degrees for the film stack, while the weak axis has an internal Brewster angle of about 60 degrees. Note that the Brewster angle for the internal layer interfaces is about the same as that of the air interfaces. When used in combination and aligned properly with a reflective polarizer such as DBEF or APF (Advanced Polarizer Film, such as APF-ND, sold under the Vikuiti™ brand by 3M Company) and a light redirecting layer, as occurs in an embodiment of the invention, significant bulb hiding is possible.

Reflector is sPS/THV Layers

One embodiment of a reflector having two Brewster angles is similar to the embodiment of FIG. 21, but the silicone polyamide of index 1.41 is replaced with THV of index 1.35. Much fewer layers, about 120 layer pairs, are needed to achieve the same effect. The film stacks of these examples can be oriented in any asymmetrical fashion from near uniform biaxial to a true uniaxial stretch in order to maximize this effect.

Figure 26:
FIG. 26 is a schematic view of a strong axis of another embodiment of a reflector.

Similar to the embodiment of FIG. 21, the reflectivity of this reflector design has a weak and a strong axis. The strong axis, illustrated in FIG. 26, has a 0.27 index differential. The weak axis, illustrated in FIG. 28 has a 0.16 in-plane index differential. The reflectivity is plotted against the angle in air for the strong axis in FIG. 27. Curve 2700 shows the reflectivity for p-polarized light for the stack with two air interfaces and curve 2704 graphs the reflectivity for p-polarized light for the stack alone.

Figure 29:
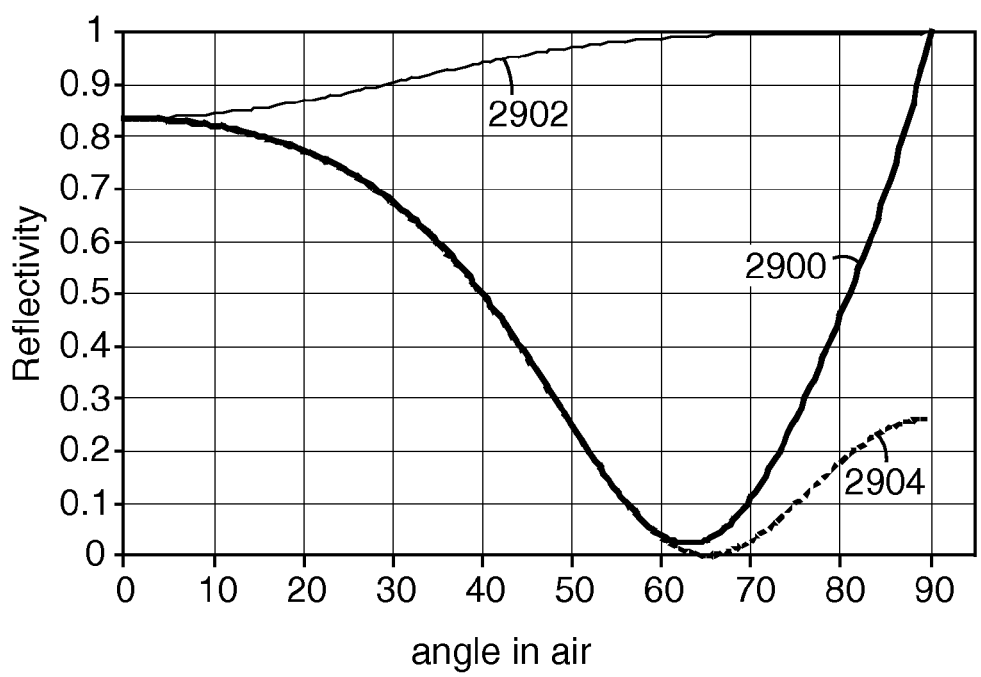
FIG. 29 is a graph of the reflectivity as a function of angle for the weak axis of the reflector of FIG. 28.

The reflectivity is plotted against the angle in air for the weak axis in FIG. 29. Curve 2900 shows the reflectivity for p-polarized light for the stack plus air interfaces, curve 2902 shows the reflectivity for s-polarized light, and curve 2904 graphs the reflectivity for p-polarized light for the stack without air interfaces. Note that minima for 2900 and 2904, with and without air interfaces, are similar in this case.

Figure 27:
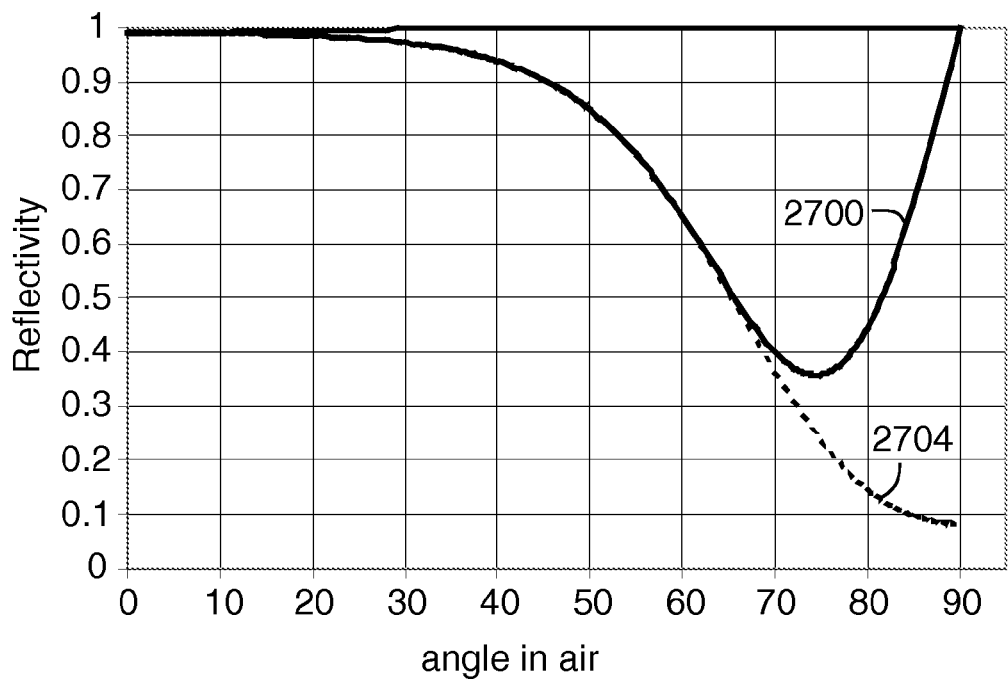
FIG. 27 is a graph of the reflectivity as a function of angle for the strong axis of the reflector of FIG. 26.
Figure 28:
FIG. 28 is a schematic view of the weak axis of the embodiment for which the strong axis is illustrated in FIG. 26.

Both axes have an internal Brewster angle, but as illustrated in FIGS. 27 and 29, the two Brewster angles are very different. The strong axis has an internal Brewster angle of greater than 90 degrees for the film stack, while the weak axis has an internal Brewster angle of about 65 degrees. When used in combination and aligned properly with a reflective polarizer such as DBEF or APF and a diffuser, as occurs in an embodiment of the invention, significant bulb hiding is possible.

Other preferred material combinations for multilayer reflectors that are useful in this invention use one of the following materials for the higher-index layer: coPEN, copolymers of PET, and PENg (a high index amorphous PEN). The term coPEN includes any copolyester of PET or polyethylene naphthalate. Examples of useful materials for the lower index materials include PMMA, silicone polyoxamide and THV.

Backlight Embodiments with Light Injection Layer and/or Extraction Layer

Figure 12:
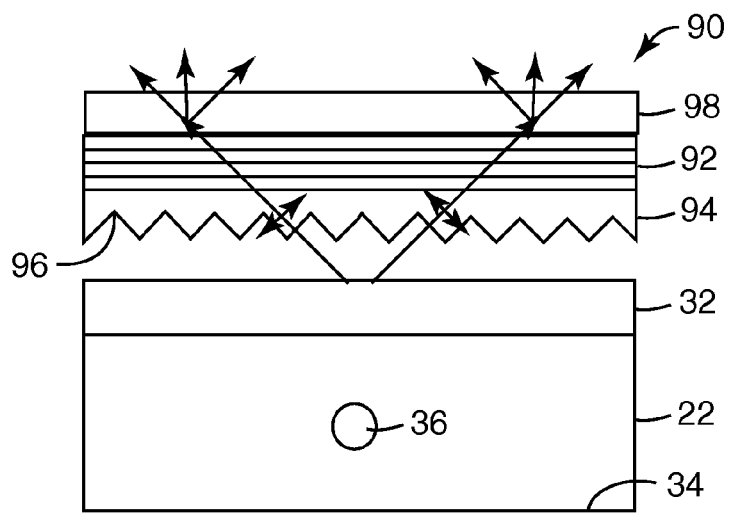
FIG. 12 is a cross-sectional view of another embodiment of a direct lit backlight assembly.

Reflectors with solid interfaces most often have Brewster angles that typically cannot be accessed from air for plane parallel interfaces. As a result, the reflector has lower overall transmission compared to the situation where a significant portion of the light impacting the reflector was doing so at the Brewster angle. The addition of structured surfaces or diffusers can make an otherwise inaccessible Brewster angle accessible by permitting the injection and extraction of light traversing reflectors at very high angles. One embodiment of a backlight 90 is illustrated in FIG. 12. In many ways similar to backlight 30 of FIG. 2, the backlight 90 includes a light cavity 22 having a reflective polarizer 32, a lamp 36 and a back reflector 34. The backlight 90 also includes a reflector 92 and a light redirecting layer 94. A light redirecting layer 94 is capable of modifying light distribution upon transmission of incident light. Layer 94 can also be referred to here as an injection layer.

In addition, systems operating with air interfaces without injection layers, such as shown in FIG. 2, also can benefit in some embodiments from a light redirecting layer, even if an extraction layer is not needed. Although the existing components of FIG. 2—light source, reflector 40 and polarizer 32—may be able to provide a uniform intensity of light to the LCD panel, in some embodiments the light is directed out to the side instead of towards the viewer. The light redirecting layer in some embodiments is a diffuser. The diffuser can randomize the direction of light exiting the reflector 40. Alternatively, the prismatic film of FIG. 14 may be used. Neither has to be laminated, i.e. an air gap may work as well or better.

Examples of structures that can act as light redirecting layers include a diffuser, a volume diffuser, and a surface structure such as a prismatic assembly, e.g. a brightness enhancement film. When the light redirecting layer 94 is a prismatic structure as illustrated in FIG. 12, the prism grooves 96 are aligned parallel to the axis of the lamp 36. One example of a prismatic structure that can be used is an Optical Lighting Film sold by 3M Company.

The diffuser can also have an additional important function. It randomizes the direction of the light, but also should transmit substantial amounts of incident light. A diffuser that is capable of randomizing the direction of light will typically also reflect substantial portions of the light back into the backlight. The reflectivity of such a diffuser increases with angle of incidence, i.e. it is lowest at normal incidence. This effect, when combined with the opposite effect of increasing transmission of reflector 40 with angle of incidence, provides a leveling effect to the intensity across the face of the backlight.

A reflector 92 with an internal Brewster angle as discussed herein is intended to preferentially transmit high angle rays as compared to normal incidence rays. However, most display devices require that the light eventually be directed normal to a display surface, so that the display luminance is highest for a viewer directly in front of the display. To extract light that is transmitted near the Brewster angle, a second light redirecting layer 98 is included on the exit side of the reflector 92 in the embodiment illustrated in FIG. 12. Layer 98 can also be referred to as an extraction layer or extractor. In one embodiment, the backlight 90 includes both the light redirecting layer 94 acting as a light injection layer and the light redirecting layer 98 acting as a light extraction layer. In other embodiments, the backlight 90 includes only one of the two light redirecting layers 94, 98.

Structures described above as examples of the light redirecting layer 94 can also serve as the light redirecting layer 98. In one preferred embodiment, the light redirecting layer 98 is CG 3536 Scotch Cal diffuser film sold by 3M Company. Lamination of a "gain diffuser" or other beaded or prismatic structures to the surface can also be used as a light redirecting layer 94 and/or light redirecting layer 98.

One example of a polarizer 32 for use in the structure of FIG. 12 is a 275 layer film of uniaxially oriented 90/10 coPEN (copolymer of polyethylene naphthalate) coextruded with PETG (glycolised polyester). In another embodiment, a diffuse reflecting polarizer is used as the polarizer.

Reflectors that exhibit an internal Brewster angle accessible in air without resorting to structured or diffuse injection layers have the advantage of requiring fewer components and thus are potentially less expensive lower cost. These reflectors can be made using polymers having a negative stress optical coefficient in a multilayer construction as described above.

Prismatic Film as Redirecting Layer

Figure 13:
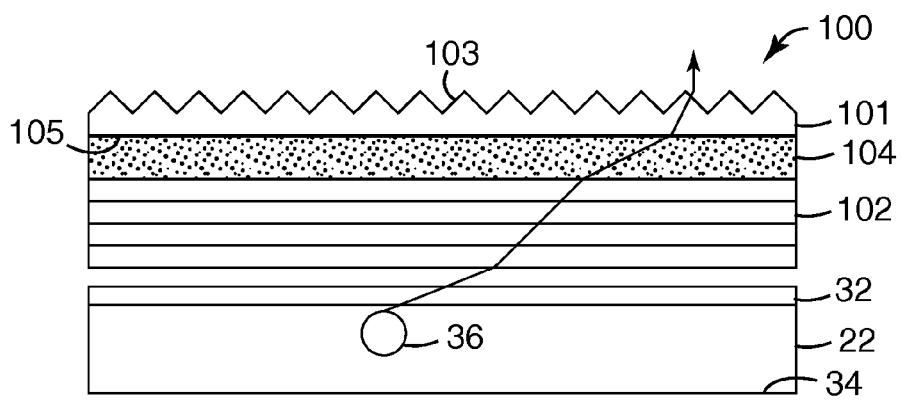
FIG. 13 is a cross-sectional view of another embodiment of a direct lit backlight assembly.

Another backlight embodiment that is capable of directing light exiting the backlight closer to the normal is shown in FIG. 13. A backlight 100 includes a micro-structured prismatic film 101 positioned on the opposite side of the reflector 102 from a light cavity 22, with the prism structures 103 pointing from the reflector. An optional adhesive layer 104 bonds the prismatic film 101 to the reflector 102. Like the other backlight embodiments that have been discussed, the light cavity 22 includes a reflective polarizer 32, a lamp 36 and a back reflector 34. The prismatic film 101 has a planar side 105 that is laminated to a freestanding reflector structure 102 in one embodiment. Alternatively, where the reflector is a multi-layer coated type of film, the reflector 102 is coated onto the planar side 105 of the prismatic film 101.

Figure 14:
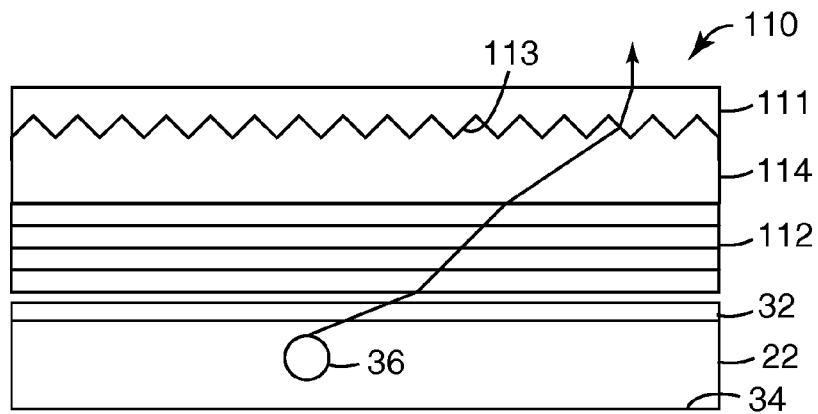
FIG. 14 is a cross-sectional view of yet another embodiment of a direct lit backlight assembly.

In an alternative embodiment shown in FIG. 14, the backlight 110 includes a micro-structured prismatic film 111 positioned with the prism structures 113 pointing toward the reflector 112. An optional adhesive layer 114 bonds the micro-structured prismatic film 111 to the reflector 112. Like the other backlight embodiments that have been discussed, backlight 110 also includes a light cavity 22 having a reflective polarizer 32, a lamp 36 and a back reflector 34.

Experimental Results

Experimental results for Examples 1 and 2 will now be described. The backlight structure 90 illustrated in FIG. 12 was built and tested as Example 1, having a diffuser as light extraction layer 98, such as CG 3536 Scotch Cal diffuser film available from 3M Company. Example 1 incorporates a prismatic layer as a light injection layer 94. To construct Example 1 for testing, a reflective polarizer 32 was laminated to an acrylic plate. This acrylic plate was positioned over the fluorescent bulb in the backlight 22, with the transmission axis of the reflective polarizer positioned orthogonal to the axis of the lamp 36. The isotropic reflector 92 with its bottom prismatic injection layer 94 and top extraction layer 98 was placed on top of this plate, leaving an air gap at the prismatic surface. The prismatic layer 94 and the extraction layer 98 were laminated to opposite sides of the isotropic reflector 92 with a clear adhesive. The isotropic reflector 92 of Example 1 was a multilayer PEN/PMMA stack having 530 layers. The individual layers ranged in thickness from about 500 nanometers to about 2000 nanometers. The indices of refraction for this reflector were 1.64 and 1.49 measured at 630 nanometers.

Example 2 is identical to Example 1, except that the light extraction layer 94 for Example 2 is 10 mil thick diffuser with particles with diameters of about 3 microns. The diffuser was measured for haze, clarity and transmission, with a BYK Gardner Hazegard Plus (T.M.) instrument, and has a haze value of 98%, clarity of 5% and transmission of 92%.

Relative light intensity was measured as a function of position across the face of the light box. The light box measured 10 cm×26.5 cm and was lined with ESR mirror film, which is multilayer polymeric Enhanced Specular Reflector (ESR) film available from 3M Company under the Vikuiti™ brand. The lamp was a fluorescent bulb running the length of the box and centered at 5 cm from each side wall. The bulb was held at a height of about 8 mm from the bottom of the box. The polarizer and other films were placed at about 16 mm from the bottom of the box. The polarizer 32 in Example 1 was a 275 layer film of uniaxially oriented 90/10 coPEN coextruded with PETG.

Figure 30:
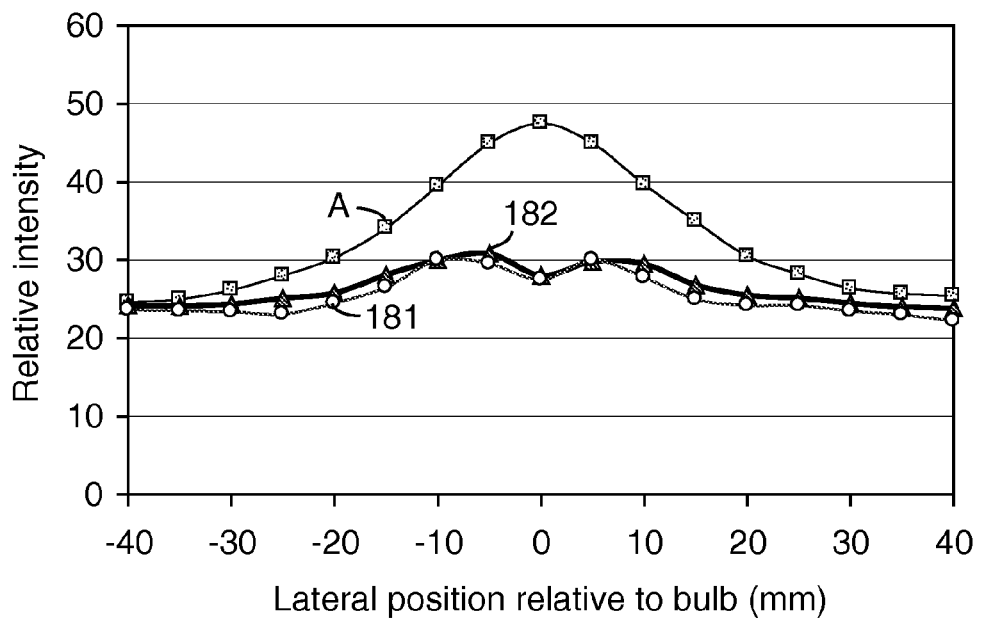
FIG. 30 is a graph of relative intensity measurements plotted against lateral position relative to a light source for three different backlight configurations.

Positionally relative intensity measurements were made by measuring the short circuit current of a silicon photo detector equipped with a photopic filter. These intensity measurements for Example 1 are plotted in FIG. 30 as curve 181 and for Example 2 are plotted as curve 182. FIG. 30 also plots the spatial transmitted intensity of Comparison Example A, which is a 3 mm thick acrylic plate that was laminated on both sides with a diffuser, specifically aCG 3536 Scotch Cal diffuser film available from 3M Company. The large central intensity peak seen with the simple diffuser films in Comparison Example A was practically eliminated with the use of the structures of Examples 1 and 2.

Note that the total intensity over the face of the box for both Examples 1 and 2 is slightly lower than for the control Example A. Although the reflective polarizer only transmits about 50% of the light of an incident ray, the reflective cavity enables significant recycling and conversion of the reflected portions of the light to eventually be transmitted. With Example 2, the extractor is a polarization preserving diffuser, and the output of the backlight is partially polarized, with the highest intensity polarization orthogonal to the bulb axis, which is also the direction of the pass axis of the reflective polarizer on the acrylic plate. This effect can be used to advantage by aligning this axis with the pass axis of the bottom absorbing polarizer of the LCD panel to increase the brightness of the display.

Figure 31:
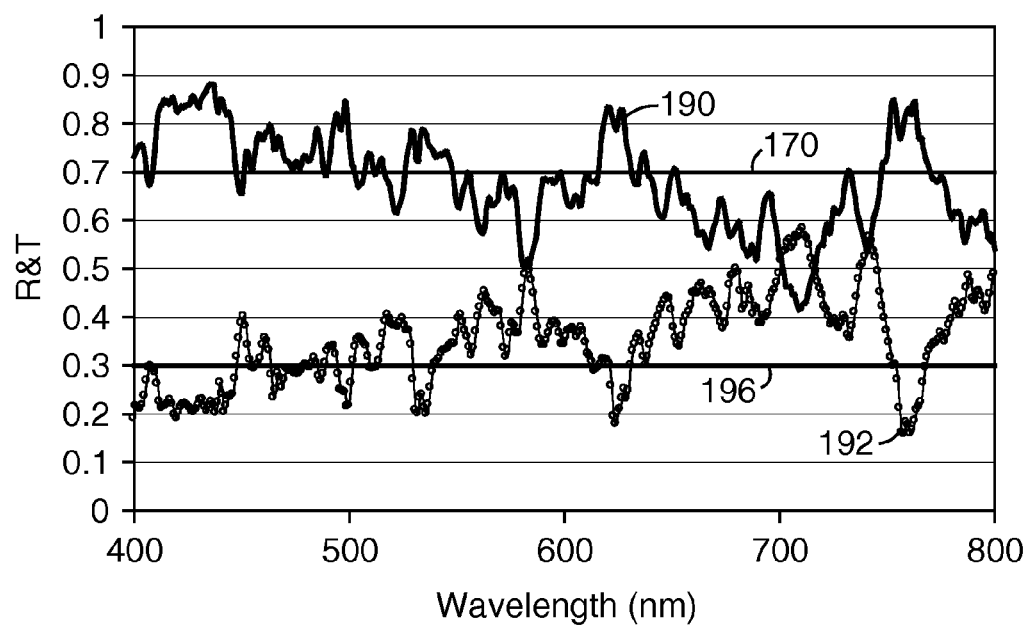
FIG. 31 is a graph of a preferred reflectance and transmittance spectrum for a reflector.
Figure 32:
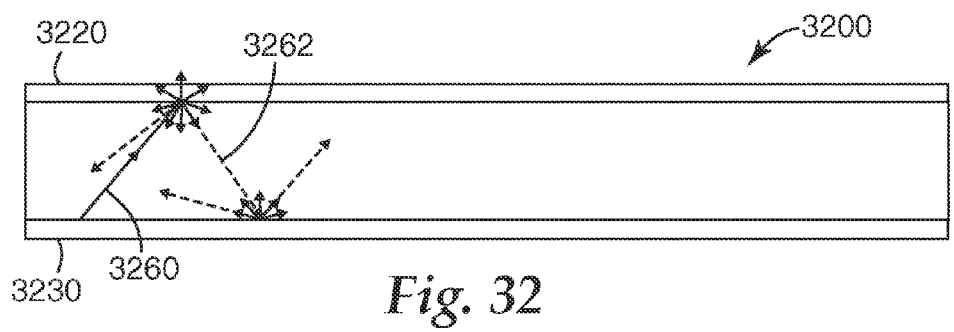
FIG. 32 is a schematic cross-section view of a portion of one embodiment of a backlight that includes a diffusely reflective front reflector and a diffusely reflective back reflector.
Figure 33:
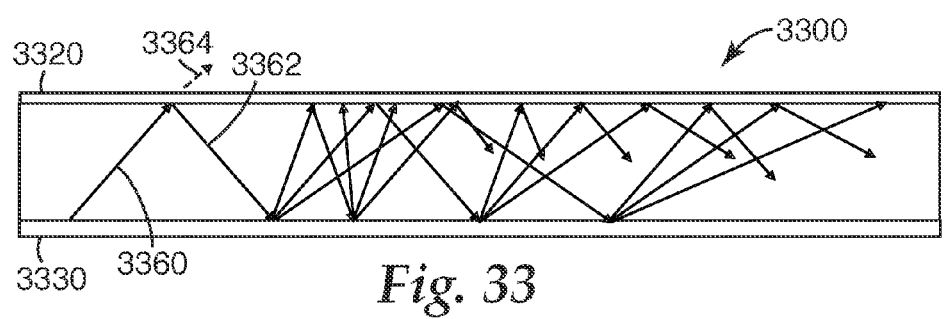
FIG. 33 is a schematic cross-section view of a portion of one embodiment of a backlight that includes a specularly reflective front reflector and a semi-specular back reflector.

FIG. 31 illustrates the reflectance spectra 190 and transmission spectra 192 for the PEN/PMMA reflector 92 of FIG. 12. One example of a desirable reflectance and transmission spectra 194 and 196 for a reflector would be fairly flat across the various colors. The optimum level of reflectance depends on the reflectance efficiency of the backlight and can be determined experimentally. In certain embodiments, this reflector preferably has little or substantially no absorption of light, in which case the transmission spectrum will be given by T=1−R. In one example, the transmission spectra 194 is fairly flat at about 70% reflectance and the transmission spectra 196 is fairly flat at about 30% transmittance.

The use of a diffuser as a light redirecting layer can mask color problems arising from a non-uniform reflectivity as a function of wavelength. It is preferable however to use reflectors that exhibit uniform transmission as a function of wavelength. Such reflectors can be made as follows.

Spectral Control

The control of color in these broadband partial reflectors is important as they are used in color displays. The color is controlled by the shape of the reflectance spectrum. U.S. Pat. Nos. 5,126,880 and 5,568,316 teach the use of combinations of thin and very thick layers to reduce the iridescence of multilayer interference reflectors. If a high reflectivity is desired at some angle, e.g. at normal incidence, then a large number of layers is required with this approach, and this results in a very thick film.

An alternative approach is to use all or mostly quarter-wave film stacks. In this case, control of the spectrum requires control of the layer thickness profile in the film stack. A broadband spectrum, such as one required to reflect visible light over a large range of angles in air, requires a large number of layers if the layers are polymeric, due to the relatively small index differences achievable with polymer films compared to inorganic films. Polymeric multilayer optical films with high layer counts (greater than about 250 layers) have traditionally been made using a layer multiplier, i.e. they have been constructed of multiple packets of layers which were generated from a single set of slot generated layers in a feedblock. The method is outlined in U.S. Pat. No. 6,738,349.

Although multipliers greatly simplify the generation of a large number of optical layers, the distortions they impart to each resultant packet of layers are not identical for each packet. For this reason, any adjustment in the layer thickness profile of the layers generated in the feedblock is not the same for each packet, meaning that all packets cannot be simultaneously optimized to produce a uniform smooth spectrum free of spectral leaks. If the number of layers generated directly in a feedblock do not provide sufficient reflectivity, then two or more such films can be laminated to increase the reflectivity. The method to produce a low color, or a controlled color spectrum, is therefore as follows:

1) The use of an axial rod heater control of the layer thickness values of coextruded polymer layers as taught in U.S. Pat. No. 6,783,349.
2) A feedblock design such that all layers in the stack are directly controlled by an axial rod heater zone during layer formation, i.e. no use of layer multipliers.
3) Timely layer thickness profile feedback during production from a layer thickness measurement tool such as e.g. an atomic force microscope (AFM), a transmission electron microscope, or a scanning electron microscope.
4) Optical modeling to generate the desired layer thickness profile
5) Repeating axial rod adjustments based on the difference between the measured layer profile and the desired layer profile.

Although not as accurate in general as an AFM, the layer profile can also be quickly estimated by integrating the optical spectrum (integrating the −Log(1−R) vs. wavelength spectrum). This follows from the general principle that the spectral shape of a reflector can be obtained from the derivative of the layer thickness profile, provided the layer thickness profile is monotonically increasing or decreasing with respect to layer number.

Recycling with Back Cavity

The lateral (spatial) distribution of light is also typically desired to be uniform. This can be achieved with a reflective backlight cavity that contains at least one diffusive element which randomizes the recycled light. The use of multiple light sources and their spacing within the backlight can also be utilized to improve the uniformity of the light emitted from the backlight. FIG. 17 illustrates these concepts in backlight 3300, which includes a light cavity 3302, a reflector with an internal Brewster angle 3304, a diffuser 3306 and an optical light directing film 3307. The light cavity 3302 includes a diffuse mirror 3308, and a number of point, serpentine or line light sources 3310.

Options for Reflective Polarizer

As discussed herein, some embodiments of the optical assembly of the present invention do not include a reflective polarizer. For embodiments that do include a reflective polarizer, there are many options for that component. Certain reflective polarizers exhibit an internal Brewster angle, while others do not, as discussed in more detail herein. A reflective polarizer used can have orthogonal reflection and transmission axes.

The reflective polarizer can be or comprise, for example, any of the dual brightness enhancement film (DBEF) products or any of the diffusely reflective polarizing film (DRPF) products, or any of the APF products available from 3M Company under the Vikuiti brand, or one or more cholesteric polarizing films. Wire grid polarizers, such as those described in U.S. Pat. No. 6,243,199 (Hansen et al.) and US Patent Publication 2003/0227678 (Lines et al.) are also suitable reflective polarizers. Uniaxially oriented specularly reflective multilayer optical polarizing films are described in U.S. Pat. No. 5,882,774 (Jonza et al.), U.S. Pat. No. 5,612,820 (Schrenk et al.), and WO 02/096621 A2 (Merrill et al.). Diffusely reflective polarizers having a continuous phase/disperse phase construction are described, for example, in U.S. Pat. No. 5,825,543 (Ouderkirk et al.). In some cases, such as with 3M™ Vikuiti™ Dual Brightness Enhancement Film-Diffuse (DBEF-D) available from 3M Company, the diffusely reflective polarizer also transmits light diffusely. Known cholesteric reflective polarizers are another type of reflective polarizer suitable for use in the disclosed backlight embodiments. In cases where the display panel 12 to be used with the backlight 30 includes its own rear polarizer for placement proximate the backlight, such as with most LCD displays, it is desirable to configure front reflective polarizer 32 to be in alignment with the display panel rear polarizer, or vice versa, for maximum efficiency and illumination. The rear polarizer of an LCD display panel is usually an absorbing polarizer, and usually is positioned on one side of a pixilated liquid crystal device, on the other side of which is a display panel front polarizer.

Options for Back Reflector

For increased illumination and efficiency, it is also advantageous that the back reflector not only have overall high reflectivity and low absorption but also be of the type that at least partially converts the polarization of incident light upon reflection. That is, if light of one polarization state is incident on the back reflector, then at least a portion of the reflected light is polarized in another polarization state orthogonal to the first state.

Many diffuse reflectors have this polarization-converting feature. One class of suitable diffuse reflectors are those used for example as white standards for various light measuring test instruments, made from white inorganic compounds such as barium sulfate or magnesium oxide in the form of pressed cake or ceramic tile, although these tend to be expensive, stiff, and brittle. Other suitable polarization-converting diffuse reflectors are (1) microvoided particle-filled articles that depend on a difference in index of refraction of the particles, the surrounding matrix, and optional air-filled voids created from stretching and (2) microporous materials made from a sintered polytetrafluoroethylene suspension or the like, and (3) structured surfaces such as a surface diffuser coated with reflective material such as silver. Another useful technology for producing microporous polarization-converting diffusely reflective films is thermally induced phase separation (TIPS). This technology has been employed in the preparation of microporous materials wherein thermoplastic polymer and a diluent are separated by a liquid-liquid phase separation, as described for example in U.S. Pat. No. 4,247,498 (Castro) and U.S. Pat. No. 4,867,881 (Kinzer). A suitable solid-liquid phase separation process is described in U.S. Pat. No. 4,539,256 (Shipman). The use of nucleating agents incorporated in the microporous material is also described as an improvement in the solid-liquid phase separation method, U.S. Pat. No. 4,726,989 (Mrozinski). Further suitable diffusely reflective polarization-converting articles and films are disclosed in U.S. Pat. No. 5,976,686 (Kaytor et al.).

In some embodiments the back reflector 34 can comprise a very high reflectivity specular reflector, such as multilayer polymeric Enhanced Specular Reflector (ESR) film available from 3M Company under the Vikuiti brand, optionally in combination with a quarter wave film or other optically retarding film. Alanod™ brand anodized aluminum sheeting and the like are another example of a highly reflective specular material. As an alternative to constructions discussed above, polarization conversion can also be achieved with a combination of a high reflectivity specular reflector and a volume diffusing material disposed between the back reflector and the front reflective polarizer, which combination is considered for purposes of this application to be a polarization-converting back reflector. Alternatively, diffusing materials or microstructured features can be applied to the surface of the specular reflector.

When back reflector 34 is of the polarization-converting type, light that is initially reflected by reflective polarizer 32, because its polarization state is not transmitted by the polarizer, can be at least partially converted after reflection by the back reflector 34 to light whose polarization state will now pass through the reflective polarizer, thus contributing to overall backlight brightness and efficiency.

Disposed within the cavity between the reflective polarizer 32 and the back reflector 34 are sources 36. From the standpoint of the viewer, and in plan view, they are disposed behind the reflective polarizer 32. The outer emitting surface of the light sources is shown to have a substantially circular cross-section, as is the case for conventional fluorescent tubes or bulbs, but other cross-sectional shapes can also be used. The number of sources, the spacing between them, and their placement relative to other components of the backlight can be selected as desired depending on design criteria such as power budget, overall brightness, thermal considerations, size constraints, and so forth.

Additional Discussion

We have thus described a variety of reflective multilayer optical films that comprise a plurality of microlayers arranged into optical repeat units. The refractive indices of the microlayers can be selected such that the films possess internal Brewster angles that provide a dramatically reduced reflectivity, and a corresponding dramatically increased transmission, at large incidence angles compared to normal incidence. Stated differently, internal Brewster angles allow the film to preferentially transmit high angle rays as compared to normal incidence rays. This preferential oblique angle transmission may be rotationally symmetric about the normal or z-axis of the films, or it may be asymmetric. In the symmetric case, the interfaces between microlayers may possess a first internal Brewster angle in a first plane of incidence (e.g. the x-z plane), and a second internal Brewster angle in a second plane of incidence (e.g. the y-z plane), where the first and second internal Brewster angles are substantially identical. In the asymmetric case the interfaces between microlayers may possess a first internal Brewster angle in the first plane that is substantially different from a second Brewster angle in the y-z plane These reflectivity and transmission characteristics of the films can be broadband, e.g., extending over the visible spectrum and being relatively flat over that range, for at least some polarizations and over a wide range of incidence angles from normal incidence to highly oblique incidence (e.g., 50, 60, 70, or 80 degrees).

The multilayer optical films, whether symmetric or asymmetric, may reflect at least 75, 80, 85, or 90% or more of normally incident unpolarized light. At oblique angles of incidence, the reflectivity of p-polarized light decreases significantly relative to normal incidence. If the film is asymmetric, this drop in reflectivity is stronger along the in-plane weak axis than along the in-plane strong axis. For example, for light incident in a weak plane containing the weak axis, the reflectivity may decrease by 50, 60, 70, or 80% at a particular oblique angle θoblique relative to normal incidence. For light incident in a strong plane containing the strong axis, the reflectivity may decrease by 40 or 50% at a particular oblique angle θoblique relative to normal incidence.

The films can be made from low loss polymer materials such that reflectivity plus transmissivity is about 100%, or R+T≈100% (e.g. at least 99%). In addition to the polymer materials mentioned above, blends of atactic polystyrene (aPS) with sPS have been found useful for modifying the birefringence of sPS. Large amounts of aPS can be added without destroying the birefringence of the sPS. The reduction in birefringence is roughly proportional to the percentage of added aPS. By this method, the Brewster angle and the on-axis reflectivity of a multilayer of sPS-aPS with a selected low index polymer can both be modified from what is achievable with sPS alone.

The reader who is familiar with the basic characteristics of multilayer optical films will know that a given pair of microlayers within the multilayer optical film will reflect different wavelengths of light as a function of the incidence angle of the light, and this is also the case for the multilayer optical films described herein. In some cases this property is exploited to construct "color-shifting" films that intentionally transmit or reflect different wavelengths as a function of incidence angle. However, the multilayer optical films described herein are designed to reflect and transmit light substantially uniformly over an extended wavelength band such as the human visible region from 400-700 nm, and are designed to do so over a wide range of incidence angles. This can be accomplished by providing the film with a sufficient number of microlayers and a suitable layer thickness gradient to provide a wide and substantially flat reflection band. The reflection band is desirably wide enough and flat enough so that as it shifts with incidence angle and polarization, a relatively flat or uniform spectral transmission and reflectivity is maintained over the extended wavelength band. The flat spectral characteristic ensures that white light is reflected or transmitted uniformly, so that the perceived color of the reflected and transmitted light does not deviate too much from the color of the source. Where the extended wavelength band of interest is the visible spectrum, providing the multilayer optical film with a flat reflection band at normal incidence from 400 to 900 nm is often adequate, assuming the film has flat major surfaces exposed to air, to ensure uniform reflectivity from 400-700 nm over all useable angles.

Lighting systems that incorporate the disclosed multilayer optical films may also include a back reflector disposed to form a light recycling cavity with the multilayer film, but the reader will understand that the multilayer optical film can also be used in lighting systems that contain no back reflector and no recycling cavity. When included, however, the back reflector may take a variety of forms depending on the intended application. In the case of a relatively inexpensive luminaire design, the back reflector may be or comprise a simple coating of white paint applied to a structural member such as a piece of sheet metal. In more demanding applications such as a backlight for an LCD TV or similar display, the back reflector may have an on-axis average reflectivity of at least 90%, 95%, 98%, 99%, or more for visible light of any polarization. Such reflectivity values encompass all visible light reflected into a hemisphere, i.e., such values include both specular and diffuse reflections. In this regard, the back reflector can be a predominantly specular, diffuse, or combination specular/diffuse reflector, whether spatially uniform or patterned. The back reflector can also be or comprise a semi-specular reflector as described in PCT Patent Application Publication WO 2008-144644, "Recycling Backlights With Semi-Specular Components", filed on May 19, 2008 and incorporated herein by reference.

In some cases, the back reflector can be made from a stiff metal substrate with a high reflectivity coating, or a high reflectivity film laminated to a supporting substrate. Suitable high reflectivity materials include Vikuiti™ Enhanced Specular Reflector (ESR) multilayer polymeric film available from 3M Company; a film made by laminating a barium sulfate-loaded polyethylene terephthalate film (2 mils thick) to Vikuiti™ ESR film using a 0.4 mil thick isooctylacrylate acrylic acid pressure sensitive adhesive, the resulting laminate film referred to herein as "EDR II" film; E-60 series Lumirror™ polyester film available from Toray Industries, Inc.; porous polytetrafluoroethylene (PTFE) films, such as those available from W. L. Gore & Associates, Inc.; Spectralon™ reflectance material available from Labsphere, Inc.; Miro™ anodized aluminum films (including Miro™ 2 film) available from Alanod Aluminum—Veredlung GmbH & Co.; MCPET high reflectivity foamed sheeting from Furukawa Electric Co., Ltd.; White Refstar™ films and MT films available from Mitsui Chemicals, Inc.; and one or more porous polypropylene films made using thermally induced phase separation ("TIPS"), described in U.S. Pat. No. 5,976,686 (Kaytor et al.).

The back reflector can be substantially flat and smooth, or it may have a structured surface associated with it to enhance light scattering or mixing. Such a structured surface can be imparted (a) on the surface of the back reflector, or (b) on a transparent coating applied to the surface. In the former case, a highly reflecting film may be laminated to a substrate in which a structured surface was previously formed, or a highly reflecting film may be laminated to a flat substrate (such as a thin metal sheet, as with Vikuiti™ Durable Enhanced Specular Reflector-Metal (DESR-M) reflector available from 3M Company) followed by forming the structured surface, such as with a stamping operation. In the latter case, a transparent film having a structured surface can be laminated to a flat reflective surface, or a transparent film can be applied to the reflector and then afterwards a structured surface can be imparted to the top of the transparent film.

For those embodiments that include a direct-lit configuration, i.e., a configuration in which one or more light sources are disposed directly behind the output or emitting area of the lighting system, the back reflector can be a continuous unitary and unbroken layer on which the light source(s) are mounted, or it can be constructed discontinuously in separate pieces, or discontinuously insofar as it includes isolated apertures, through which light sources can protrude, in an otherwise continuous layer. For example, strips of reflective material can be applied to a substrate on which rows of light sources are mounted, each strip having a width sufficient to extend from one row of light sources to another and having a length dimension sufficient to span between opposed borders of the backlight's output area.

The lighting system may also include one or more light sources that are disposed to emit light into the recycling cavity. The light sources may emit light over an extended wavelength band of interest, typically, the visible spectrum, or may emit a narrow band of ultraviolet, visibly colored, or infrared light such as from an LED or a laser. Cold cathode fluorescent lamps (CCFLs), for example, provide white light emission over their long narrow emissive areas, and those emissive areas can also operate to scatter some light impinging on the CCFL, such as would occur in a recycling cavity. The typical emission from a CCFL has an angular distribution that is substantially Lambertian, which may be inefficient or otherwise undesirable in some ultra low loss backlight designs. Also, the emissive surface of a CCFL, although somewhat diffusely reflective, also typically has an absorptive loss that may be excessive in such applications. On the other hand, fluorescent light sources are perfectly adequate in higher loss systems such as overhead luminaires or task lighting.

Light emitting diodes (LEDs) are also suitable for use as the light source(s). An LED die emits light in a near-Lambertian manner, but because of its much smaller size relative to CCFLs, the LED light distribution can be readily modified, e.g., with an integral encapsulant lens, reflector, or extractor to make the resulting packaged LED a forward-emitter, a side-emitter, or other non-Lambertian profile, which may be beneficial in some applications. However, the smaller size and higher intensity of LED sources relative to CCFLs can also make it more difficult to produce a spatially uniform backlight output using LEDs. This is particularly true in cases where individually colored LEDs, such as arrangements of red/green/blue (RGB) LEDs, are used to produce white light, since failure to provide adequate lateral transport or mixing of such light can result in undesirable colored bands or areas. White light emitting LEDs, in which a phosphor is excited by a blue or UV-emitting LED die to produce intense white light from a small area or volume on the order of an LED die, can be used to reduce such color non-uniformity. But white LEDs currently are unable to provide LCD color gamuts as wide as those achievable with individual colored LED arrangements and thus may not be desirable for all end-use applications.

Alternatively, white light can be generated from a blue or UV LED, or in general any longer wavelength light from a shorter wavelength source, by adding a phosphor in a location apart from the LED in or on a light recycling cavity which utilizes the films of this invention for directional light control or light mixing. This arrangement is sometimes referred to as a "remote phosphor".

Whichever light sources are used, they may be positioned directly behind an extended output surface of the system, e.g., directly behind the multilayer optical film, or may be positioned along the edge of the output surface. The former case is referred to as a "direct-lit" system, and the latter is an "edge-lit" system. In some cases, a direct-lit system may also include one or some light sources at the periphery of the device, or an edge-lit system may include one or some light sources directly behind the output area. In such cases, the system can be considered to be "direct-lit" if most of the light originates from directly behind the output area, and "edge-lit" if most of the light originates from the periphery of the output area. Direct-lit systems are susceptible to the phenomenon of "punchthrough", where a bright spot appears in the output area above each source. Edge-lit systems typically include a solid light guide that carries or guides light from the edge-mounted light source to all portions of the output area, the light guide also having light extraction features to direct light out of the light guide towards a viewer. If the system is a backlight for a liquid crystal display (LCD) device, then additional components would typically be included between the film and the viewer, such as one or more polarizers (including absorbing polarizers and reflecting polarizers), diffusers, prismatic films (including any of the Brightness Enhancement Films (BEF) available from 3M Company and including available turning films), and a liquid crystal panel. If the system is simpler, such as an overhead luminaire or a task light, then additional components may include a diffuser film or panel, and/or other rigid light-transmissive panel to which the disclosed multilayer optical film may be laminated or against which the disclosed multilayer optical film may be placed.

As already mentioned, the foregoing Brewster angle multilayer optical films can be used in a variety of lighting systems, not limited to direct lit LCD backlights. Luminaires for room and space lighting, street lamps, backlit signage and other illumination purposes are contemplated. A lighting system as described herein may comprise several key elements listed here and described in more detail below:

1) one or more light sources and their placement (many examples above);
2) a light recycling cavity defined principally by
   (2a) a high efficiency back reflector, and
   (2b) a front partially transmissive reflector (e.g., one of the films described herein or incorporated by reference);
3) one or more diffusing elements (which can be a part of element 2, or separate) located between the front and back reflectors; and
4) a light redirecting layer located on the exit side of the front reflector.

Edges of the cavity can be designed to be part of either the front or back reflector, depending on the desired light output from the edges.

A key function of the recycling cavity and diffuser elements is to provide a uniform, or other designed flux of light to the input surface of the light redirecting layer. The light redirecting layer then provides the desired directionality to the light emitted by the system. The above four elements are available with a great variety of attributes which can be chosen in the appropriate combinations so as to solve a large variety of current needs in the lighting industry with respect to uniformity and directionality from thin, large area lighting systems. The relevant aspects of each component are discussed in more detail below.

1. Light Sources

The light sources can be placed on the edges, for edge lit systems, or placed in a direct lit manner as discussed above. Placement of the sources, and directionality of the light emission from the sources, and how it relates to the angular performance of the reflectors and diffusers in the system, can have a large impact on the efficiency and the uniformity of the lighting system.

Whether these characteristics can be successfully incorporated into a backlight depends in part on the type of light source used for illuminating the backlight. CCFLs, for example, provide white light emission over their long narrow emissive areas, and those emissive areas can also operate to scatter some light impinging on the CCFL, such as would occur in a recycling cavity. The typical emission from a CCFL however has an angular distribution that is substantially Lambertian, and this may be inefficient or otherwise undesirable in a given backlight design. Also, the emissive surface of a CCFL, although somewhat diffusely reflective, also typically has an absorptive loss that may be significant if a highly recycling cavity is desired. An LED die also emits light in a Lambertian manner, but because of its much smaller size relative to CCFLs, the LED light distribution can be readily modified e.g. with an integral encapsulant lens or reflector or extractor to make the resulting packaged LED a forward-emitter, a side-emitter, or other non-Lambertian profile. Such non-Lambertian profiles can provide important advantages for the disclosed backlights. However, the smaller size and higher intensity of LED sources relative to CCFLs can also make it more difficult to produce a spatially uniform backlight output area using LEDs. This is particularly true in cases where individual colored LEDs, such as arrangements of red/green/blue (RGB) LEDs, are used to produce white light, since failure to provide adequate lateral transport or mixing of such light can easily result in undesirable colored bands or areas. White light emitting LEDs, in which a phosphor is excited by a blue or UV-emitting LED die to produce intense white light from a small area or volume on the order of an LED die, can be used to reduce such color non-uniformity, but white LEDs currently are unable to provide LCD color gamuts as wide as those achievable with individual colored LED arrangements, and thus may not be desirable for all end-use applications. The phosphor based LEDs generally produce a Lambertian directional output. LEDs without phosphor are available with Lambertian, batwing, or side emitting profiles which can be used to optimize the performance of a system.

As an alternative to a phosphor LED, the phosphor layer can be coated on or otherwise attached to other elements within the cavity or on the exit side of the front reflector.

2. Light Recycling Cavity and Diffusers

An efficient light recycling cavity is intended to efficiently mix both the directionality and the polarization directions of light injected into or recycled within the cavity. This requires both low loss reflectors and light redirecting elements located between the two reflectors. In the recycling optical cavity, a large proportion of the light undergoes multiple reflections between substantially coextensive front and back reflectors before emerging from the front reflector, which is partially transmissive and partially reflective.

The front reflector has a high enough reflectivity for such useable light to support lateral transport or spreading of the light as required, and for light ray angle randomization to achieve acceptable spatial uniformity of the backlight output, but a high enough transmission into the appropriate application-useable angles to ensure application brightness of the lighting system is acceptable. Overall losses for light propagating in the recycling cavity are kept extraordinarily low, for example, both by providing a substantially enclosed cavity of low absorptive loss, including low loss front and back reflectors as well as side reflectors, and by keeping losses associated with the light sources very low, for example, by ensuring the cumulative emitting area of all the light sources is a small fraction of the backlight output area.

There may be instances where Lambertian emitting LEDs are preferred in a direct-lit backlight for reasons of manufacturing cost or efficiency. Individual light deflection devices may not be preferred for similar reasons. Good uniformity and the reduction of "punchthrough" may still be achieved with the use of the films described herein. If the front reflector is highly reflective, e.g., having less than about 10% or less than 5% transmission at normal incidence, then the LED will be less visible when the system is viewed at normal incidence. Although the films described herein may have higher transmission at oblique angles, the intensity of the light from a given point source such as an LED will decrease with a 1/R^2 value where R is the distance from the LED to a point on the front reflector. Thus when viewed at oblique angles, the punchthrough is reduced by this distance factor in the intensity. When combined with a partial reflectivity of the film even at oblique angles, the punchthrough is even more reduced. In addition the light that is rejected at normal angles, when scattered by the appropriate diffusing elements as described below, is distributed to further increase the uniformity of the system.

3. Diffusing Elements

The recycling optical cavity contains a component or components that provide the cavity with a balance of specular and diffuse characteristics, the component having sufficient specularity to support the desired degree of lateral light transport, but also having sufficient diffusivity to substantially provide the desired the angular and spatial distribution of steady state light within the cavity. For polarized lighting systems, recycling within the cavity preferably includes a degree of randomization of reflected light polarization relative to the incident light polarization state, which allows a mechanism by which non-useable polarized light is converted into useable polarized light. The combination of the front and back reflectors and the diffusing elements create a light guide that controls the transport of light from the individual light sources to the surface of the front reflector. The mechanisms that control this process are now discussed.

A pure specular reflector, sometimes referred to as a mirror, performs according to the optical rule that states, "the angle of incidence equals the angle of reflection". A hollow cavity design having the front and back reflector both purely specular provides maximum lateral transport of the light across the cavity, since the recycled ray is unimpeded in its lateral transit of the cavity. However, no angular mixing occurs in the cavity, since there is no mechanism to convert light propagating at a given incidence angle to other incidence angles. A purely Lambertian reflector, on the other hand, redirects light rays equally in all directions. This is seen in the hollow cavity design of FIG. 13, where the front and back reflector are both purely Lambertian. The same initially launched oblique light ray is immediately scattered in all directions by the front reflector, most of the scattered light being reflected back into the cavity but some being transmitted through the front reflector. Some of the reflected light travels "forward" (generally to the right as seen in the figure), but an equal amount travels "backward" (generally to the left). By forward scattering, we refer to the lateral or in-plane (in a plane parallel to the scattering surface in question) propagation components of the reflected light. When repeated, this process greatly diminishes the forward directed component of a light ray after several reflections. The beam is rapidly dispersed, producing a greatly reduced lateral transport compared to a specular system.

A semi-specular reflector provides a balance of specular and diffusive properties. In the hollow cavity design of FIG. 14, the front reflector is purely specular but the back reflector is semi-specular. The reflected portion of the same initially launched oblique light ray strikes the back reflector, and is substantially forward-scattered in a controlled amount. The reflected cone of light is then partially transmitted but mostly reflected (specularly) back to the back reflector, all while still propagating to a great extent in the "forward" direction.

Semi-specular reflectors can thus be seen to promote the lateral spreading of light across the recycling cavity, while still providing adequate mixing of light ray directions and polarization. Reflectors that are partially diffuse but that have a substantially forward directed component will transport more light across a greater distance with fewer total reflections of the light rays. In a qualitative way, we can describe a semi-specular reflector as one that provides substantially more forward scattering than reverse scattering. A semi-specular diffuser can be defined as one that does not reverse the normal component of the ray direction for a substantial majority of the incident light, i.e. the light is substantially transmitted in the forward (z) direction and scattered to some degree in the x and y directions. A more quantitative description of semi-specular is given in commonly assigned PCT Application Publication No. WO 2008/144644, "Recycling Backlights With Semi-Specular Components", filed May 19, 2008.

As an alternative to the two-component systems of FIG. 14, additional optical components can be inserted into the recycling cavity between the front and back reflectors, and such additional components may be tailored to provide the desired degree of semi-specularity to the cavity. Although it is often desirable to minimize the number of components in the cavity, the use of a third component can sometimes provide a higher efficiency cavity by allowing for the minimal loss design of the front or back reflector.

The mixing of light rays in the cavity with scattering elements can be accomplished in several ways. It can be done by diffusing elements that are either an integral part of the front or back reflector or are laminated to the front or back reflector, or by use of a separate diffusing sheet placed anywhere between the two. Combinations of any of these options are also possible. The choices depend on the relative importance of matters such as optical losses, component cost, and convenience of manufacturing. The diffusing element may be attached to or an integral part of either the front or back reflector, or an air gap may be provided between the diffuser and the reflectors.

Whether the diffuser is an integral part of either reflector, or laminated to either reflector, or placed in the cavity as a separate component, the overall desired optical performance is one of controlling the angular spreading function for a ray that completes one round trip passage from the back reflector to the front and back again. A semi-specular reflector can have characteristics of both a specular and a Lambertian reflector or can be a well defined Gaussian cone about the specular direction. Alternatively, a diffuser can have significant back-scattering properties such as for a retro-reflective film or coating. Keeping in mind that the diffuser component can also be separate from the reflector, several possible constructions exist to create the back reflector with controlled degree of diffusion:

(1) partial transmitting specular reflector on a high reflectance diffuse back reflector;

(2) partial Lambertian diffuser covering a high reflectance specular back reflector;

(3) forward scattering diffuser on a high reflectance specular back reflector;

(4) partial retroreflecting coating on a specular back reflector;

(5) corrugated high reflectance specular reflector;

(6) diffuse reflector.

For each construction, the first element listed is arranged to be facing inside the cavity. The first elements of constructions (1) through (4) can be continuous or discontinuous over the area of the back reflector. In addition, the first element could have a gradation of diffuser properties, or could be printed or coated with additional diffuser patterns that are graded. The graded diffuser is optional, but may be desirable to optimize the efficiency of various backlight systems. The term "partial Lambertian" refers to an element that only scatters some of the incident light. The fraction of light that is scattered by such an element is directed almost uniformly in all directions. In construction (1), the partial specular reflector is a different component than that utilized for the front reflector. The partial reflector in this case can be either a spatially uniform film of moderate reflectivity, or it can be a spatially non-uniform reflector such as a perforated multilayer or metallic reflector. The degree of specularity can be adjusted either by changing the size and number of the perforations, or by changing the base reflectivity of the film, or both.

Construction (5) can be made by thermally embossing a multilayer polymeric mirror film, or by physically corrugating such a film. Additionally, any surface with these shapes can be coated with a metallic or enhanced metal reflective film. Furthermore, the semi-specular constructions of (1) through (4) can be corrugated or embossed in order to optimize their light transport properties.

Some of these combinations are also possible for the front (partial) reflector, such as the diffuse element in (2), (3), (4), and (5), or any combination thereof with any of the front reflectors of this invention. Again, the first element listed is arranged to be inside the recycling cavity. The first element of all three constructions can be continuous or discontinuous over the area of the partial reflector, and the first element can have a gradation of diffuser properties, or can be printed or coated with additional diffuser patterns that are graded.

Quantitatively, the degree of semi-specularity (specular vs. Lambertian vs. retro-reflecting characteristic of a given reflector or other component) can be effectively characterized by comparing the fluxes of the forward- and back-scattered light components, referred to as F and B respectively. The forward and back-scattered fluxes can be obtained from the integrated reflection intensities (or integrated transmission intensities in the case of optically transmissive components) over all solid angles. The degree of semi-specularity can then be characterized by a "transport ratio" T, given by:

$$T=(F-B)/(F+B).$$

T ranges from −1 to 1 as one moves from purely retro-reflection to pure specular reflection. With a perfect retro-reflector, all light is backscattered, giving F=0 and B=1. For a pure Lambertian reflector, the forward- and back-scattered fluxes are the same (F=B), and thus T=0. For a pure specular reflector there is no back-scatter (B=0), and therefore T=F/F=1. Examples with experimentally measured values are given in commonly assigned PCT Application Publication No. WO 2008/144644, "Recycling Backlights With Semi-Specular Components", filed May 19, 2008. The transport ratio for any real reflective or transmissive component is a function of incidence angle. This is logical, because one would expect the amount of forward-scattered light, for example, to be different for a near-normally incident ray than for a grazing-incident ray.

Characterization of a diffuse reflector can be made with an Autronics Conoscope, available from autronic-MELCHERS GmbH, Germany, in the reflectance mode. The sample is placed about 2 mm from the conoscope lens, at the focal point. The sample is illuminated by the instrument with white collimated light with a chosen angle of incidence. The light reflected from the sample is collected by the conoscope lens and imaged onto a two dimensional detector array (CCD camera). This image is transformed into an angular distribution function using the calibration file. The instrument provides a very useful comparison of the angular reflection properties of various semi-specular and diffuse reflectors. A significant specular component of a reflector can result in saturation of the detector near the specular angle, but this value can be measured separately on a machine setting of lower sensitivity.

The transport ratio is well defined for a single interaction of a light ray at one angle with a reflector or a diffuser. A good recycling cavity creates multiple interactions of a light ray at all angles with at least two reflecting or diffusing components, and perhaps three or more such components. Since the transport ratio for a single interaction is a function of the angle of incidence, the description of an overall cavity transport ratio is therefore more complex than for a single component. An "effective cavity transport ratio" or more descriptively a "cavity transport value", should be a measure of how well a cavity can spread injected light from the injection point to distant points in the cavity and still randomize it sufficiently to direct light uniformly towards a user. A simple method of estimating relative cavity transport values is useful for judging the comparative merits of various combinations of specular, semi-specular, and Lambertian components. For this purpose we define the forward transport number fT for each component, expressed as:

$$fT=F/(F+B)$$

where F and B are defined and measured as described herein but now averaged over all angles of a single interaction. Measurements at intervals of about 10 degrees from 10 to 80 degrees is sufficient to give a proper average. F and B are the relative fractions of forward and backscattered light and by definition, F+B=1, giving simply fT=F which is the fraction of forward scattered light. The cavity transport CT is then the product of the F values of the front and back reflector of the cavity:

$$CT = F_{front} * F_{back}$$

For example, if the front reflector is specular, having $F_{front}=1$ and a semi-specular back reflector with $F_{back}=0.75$ (transport ratio T=0.5) then the overall cavity transport value is given by CT=1*0.75=0.75.

With most common diffusers, T ranges between 0 and 1 as described above and fT ranges from 0.5 to 1.0. However, if a material which possesses some retro reflecting property is utilized as a diffuser, T can be negative and can range from 0 to −1 for such a material and F will range from 0 to 0.5. Retro-reflecting glass beads are an example, as are prismatic structures with 90 degree, or near 90 degree, angled facets.

As another example, if the front reflector is Lambertian so that $F_{front}=0.5$ (T=0) and the back reflector is semi-specular so that $F_{back}=0.75$ (T=0.5), then the overall cavity transport value is CT=0.5*0.75=0.375. One would expect the latter cavity to transport much less light to a given distance from the injection point than the first example cavity. This prediction is confirmed by experiment as described herein.

For some applications, the front reflector may consist of a stack of several components, such as a specular or a semi-specular reflector followed by a light redirecting layer or one or more diffusers that may or may not be laminated to each other. The front and back reflectors each can be defined as a collection of components assembled in a specific order. The collective transport properties of all components that make up the front reflector or the back reflector can be determined with one measurement. The effect of an individual component (e.g., a film) on the transport properties of a stack of components depends on the component's sequence and orientation in the stack and the properties of the other components in the stack. For at least these reasons, the stack can be measured as a whole. The components of the front reflector can be placed in the measuring device, such as the ones made by Autronics and by Radiant Imaging (Duvall, Wash., USA), with the inside cavity surface facing the measuring light beam.

The measurement of F and B described above for semi-specular reflectors is done in reflection mode, which means that portions of the incident beam pass through the diffuse layer twice or reflect from it once. If the diffuser were an intermediate component positioned somewhere in the cavity between the front and back reflectors, then light rays pass through it twice in making one front to back cycle during the transport process. For this reason, we define the F and B values of an intermediate component as those measured in the same manner as a diffuser coated on a mirror. The intermediate component can be grouped with either the front or the back reflector, and the combined transport properties of the intermediate component and the chosen reflector can be measured together. If the majority of the light is injected into the cavity above an intermediate component (or though-holes in it from below), then the intermediate component can be grouped with the bottom reflector. If the majority of light is injected below an intermediate component, then the intermediate component can be grouped with the front reflector for transport measurement.

4. The Light Redirecting Layer

When the disclosed films are utilized as the front reflector in a light cavity, the light redirecting layer receives the light flux from the cavity. The light flux incident on the redirecting layer will have angular distributions that are centered around predetermined values of $\theta_0$ and $\phi_0$, the polar and azimuthal angles of maximum light transmission of the film. The angle ranges $\Delta\theta$ and $\Delta\phi$, given by $\Delta\theta e$ and $\theta\phi e$, allow for the design of microstructures that can efficiently redirect most of the light into a desired range of angles. The light redirecting layer can be a bulk diffuser for Lambertian output or prismatic or holographic structures for specific angle control. The parameters by $\Delta\theta e$ and $\Delta\phi e$ are discussed more fully in commonly assigned U.S. application Ser. No. 13/129,513, "Reflective Film Combinations With Output Confinement in Both Polar and Azimuthal Directions and Related Constructions", filed on even date herewith and incorporated herein by reference.

The surface structures can be placed on the side of the multilayer film opposite the side on which the light is incident. These multilayer films are specifically designed to have relatively high average reflectivity at normal incidence, (on the order of 90% or greater), and thus may be considered to be "mirrors", but they are also designed to transmit substantial amounts of light in certain angular ranges, either azimuthal or polar, or both.

In order to redirect the light towards the normal, which is desirable for a liquid crystal display backlight for example, certain structured forms can be placed on or above the mirror surface from which the light exits. These structures can be prismatic, or can be spherical or partial spheres or other regular or irregular shapes. The structures can also be controlled in size so as to either refract light or to diffract light, or combinations of both. The degree of directional symmetry of the mirror with respect to the transmission of light incident in different planes may determine whether a one-dimensional or a two dimensional structure is added to the mirror to redirect the transmitted light. Some mirrors transmit substantially along only one axis of the film, i.e. they create a substantially narrow cone of directional light. These "1D" mirrors can more effectively utilize 1D, e.g. linear, surface structures wherein the linear structures are placed at an angle to the major plane of transmission, typically perpendicular to this transmission axis. Some examples are given below. In general, no surface structure is needed on the incident side of the mirror although structure can be added to enhance some directional behavior of the film reflectivity. Other mirrors can transmit over a broader angular range and can better utilize a two dimensional structure to redirect the light.

Previously, surface structure was added to mirrors to diffuse or redirect the incident light which is reflected. We disclose here that the structure can be added to redirect the portion of the light which is transmitted. The films and the microstructures described above can be used in a backlight to provide various degrees of collimation of substantially random directional light. Compressing the angular range of light exiting a backlight is difficult when the source light is highly random, or Lambertian, a condition which is often required for uniformity. The Brewster mirror films and other components disclosed herein can aid in creating highly directional light sources. Additionally, these mirrors can aid in hiding bright point or line sources of light. The uniformity requirements of displays often require a randomization of the output of a light source. The problem is even greater when very bright point sources of light such as LEDs are used in a direct lit display backlight. A distinguishing feature of the mirrors used in these articles is that little or no structure is needed on the incident side of the mirror to create these directional effects since they arise from the optics of planar birefringent interfaces.

Two dimensional structures can be both random or ordered arrays. Two dimensional structures such as an array of beads, spheres, pyramids, etc. can be used on both symmetrical and asymmetrical reflectors. They can be either preformed structures that are coated on with a binder, or can be embossed, i.e., replicated by thermal embossing of a solid surface layer or by a cast and cure process or by extrusion melt coating and embossing. The structures can be close packed or spaced apart. Alternatively, a film containing such surface structures can be laminated.

The 2D structures can be rounded or pyramidal, or combinations of both. A particularly useful structure is a rounded conical structure similar to a "nose cone" of an airplane. This structure reduces the flat area which occurs on the tops of spherical structures. The individual elements can be solids of revolution or can be multi-faceted.

The output distribution of ray angles from the exit surface of the partial mirror can be compressed to a narrower range of angles by the addition of various surface structures. The degree of collimation is dependent on the shape of the structure, the shape being generally characterized by the distribution of surface normal vectors to the surface.

The structure disclosed in U.S. Pat. No. 3,829,680 (Jones) which is used for creating a batwing distribution can be used in conjunction with the disclosed Brewster angle mirrors to modify their batwing distribution. This structure creates the batwing distribution by retro-reflecting a range of light rays that strike the exit plane near normal incidence. Such a structure can work well with the disclosed Brewster angle mirrors because they already block most of those near normal rays, and deliver more of the higher angle rays which are then bent closer to the normal by the structured surface. In this manner, the maximum output angle of the Brewster mirrors (near 60 or 70 degrees) can be redirected to smaller angles. Furthermore, since the mirror itself can block the near normal rays, the microstructure no longer needs to be retro-reflecting and can be modified from that of Jones to enhance the angle of refraction of the more oblique rays.

In general, optical elements such as the multilayer films described herein which selectively transmit light over a limited range of hemispherical angles are useful for enhancing the performance of microstructured light redirecting layers. Microstructures have limited use in controlling the directionality of light from a Lambertian source. However, the films here transmit only a selected portion of the Lambertian distribution, enabling the design of specialized surface structures that can more effectively redirect that light.

An exemplary microstructure is one with a distribution of surface normals that will refract the high angle rays transmitted by the multilayer film to angles closer to the normal. Instead of only one surface normal angle, the prism facet is represented by a continuous range of surface normals. This structure can be either a linear array of prisms having curved facets, or can be rotationally symmetric structures such as a "nose cone" structure, or they can be elongated 3D structures.

Lighting Systems

Figure 34:
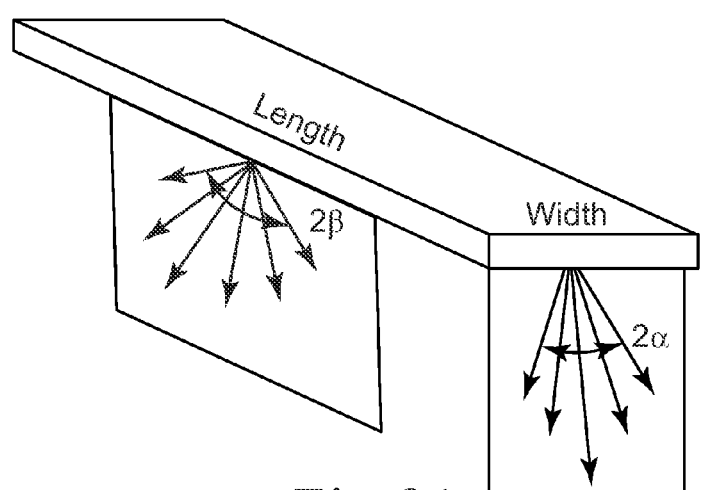
FIG. 34 is a perspective view of a luminaire having different output divergence or collimation in orthogonal planes.

A schematic of an exemplary lighting system is shown FIG. 34. Using the principles outlined above, a thin, large area efficient lighting system can be constructed having designed collimated light output angle distributions $2\alpha$ and $2\beta$. The angles $\alpha$ and $\beta$ can be derived from the basic film characteristic output angles $\Delta\theta e$ and $\Delta\phi e$ respectively and the light redirecting layer can be designed by the uses of standard optical design and ray tracing tools. The light distributions $2\alpha$ and $2\beta$ are defined as the range of angles over which the light intensity falls to 1/e of the central value. If $2\alpha$ is the angle range determined by $\theta e$ and the microstructure, it can be as large as 180 degrees, or as narrow 20 degrees. Intermediate values of 30, 45, 60, 90 and 120 degrees are also readily achieved. If $2\beta$ is the angle range determined by the azimuthal range $\Delta\phi e$ and the microstructure, it can be as large as 180 degrees or as small as 45 degrees. Intermediate values of 60, 90, and 120 degrees are also readily achieved. The principal axes of the multilayer film and the prisms can be oriented at any angle with respect to the edge of a luminaire or other lighting device. In FIG. 34, the axes are aligned for illustrative purposes only. In addition to a rectilinear shape, the lighting system can be any shape. The profile can be very thin, although thick (deep) cavities are easily constructed as well.

The lighting systems can be edge lit, direct lit, or a combination of both.

The front reflector can be attached to the light redirecting layer, or both can be attached to a plate such as a glass or rigid polymer plate. The glass or plate can be a component of another system, typically the system to be illuminated by the lighting system. An example is an LCD panel.

Direct Lit Hollow Lighting System with Bulb Hiding and Zone Control

For enhanced light transport in an edge lit hollow cavity light system, the cavity transport ratio CT and thus the forward transport ratios fT of the front and back reflectors are chosen for high values of light transport in order to spread light efficiently across large distances in the cavity in order to promote uniformity. However, in the case of direct lit zoned backlights for LCDs, there is a need to limit the range of light spreading from a given small area source, as for example, from one or a few LEDs in a localized lighting zone. However, the uniformity within a zone must still be created by some means and both the cost and ease of manufacturing are major considerations. For these latter reasons, it is desirable to confine the light from a given local source without the use of walls or other reflective barriers between the various zones in the system.

To accomplish both uniformity and limited light spreading within an open system, several components should be used concurrently. These components are:

(1) an angle selective partially transmitting reflector on the front plate;

(2) a diffusing component;

(3) front and back reflectors which combine to give a low or a negative cavity transport ratio;

(4) a localized light source with an emission pattern chosen to compliment the angle selection of the front reflector; and (5) a light redirecting layer.

In addition, both the front reflector and the back reflector should have high efficiency to provide for low loss in a highly recycling cavity.

These components are discussed in some detail above. The first component can be the angle selective reflectors this invention. For a two dimensional (2D) array of small area light sources, a reflector having a Brewster angle of less than 90 degrees in air along both orthogonal in-plane axes may be chosen if transmission of light is desired in both in-plane directions of the system. For a 1D array of sources (e.g. fluorescent bulbs or e.g. a lineal array of LEDs), an azimuthly selective reflector may be chosen, again with at least one axis having a Brewster angle of less than 90 degrees in air. Bulb hiding is a primary concern in direct lit systems. To reduce or eliminate the visibility (punch through) of bright, small-area sources the front reflector can be chosen to have high reflectivity at normal incidence, with gradual increase in transmissivity as the angle of incidence increases. $R_{normal}$ can be greater than 80%, greater than 90% or greater than 95%. If a small area source has a modified output distribution that greatly reduces the amount of vertically emitted light, then the top reflector can be chosen to have a reflectivity vs. angle that is flat or increases with angle of incidence, provided it has an overall $T_{Hemi}$ that is low enough to provide for substantial recycling of the light. $T_{Hemi}$'s of 30%, 20%, 10% and even 5% are useful for this purpose. Front reflectors with significant Brewster minima in reflection are useful, even if the Brewster angle is greater than 90 degrees in air. However, the reflectivity at the Brewster minimum should be at about 50% or less than the reflectivity at normal incidence. The first component can be laminated to a rigid plate, which may be a part of another system, such as an LCD panel.

Components (2) and (3) are discussed above with respect to cavity transport. The lower the cavity transport ratio the more reflections are required for the light to spread from a point source. Such a system, when supplied with a significant diffusion mechanism, will provide mixing via multiple reflections of the light, but substantial portions of the light will reflect back and forth within a local geometry as the light slowly exists the top plate. However, any coating that is placed on the front reflector to modify its specular properties should not grossly interfere with its angle selective reflection properties. Alternatively, a light scattering layer with chosen transport ratio can be placed against the front reflector with an air gap. If the back reflector is highly retro-reflecting to the point of sending all of the light directly back into the source, then some diffusion may desirably be added in order to spread the light so most of it does not return to the source where it can be absorbed. The action of the retro-reflector in combination with a top specular or semi-specular reflector for confining light to a zone is to repeatedly send light from and then back towards any of the local light sources in the cavity. With common retro-reflectors such as high index glass beads, a substantial amount of diffusion will occur, providing for a more uniform distribution of light in the area near the source as a result of the repeated reflections.

Diffuse reflectors, or separate diffusers with transport ratios of 0.25 or less are useful for this application. Diffuse components with T less than 0.1 or less than 0 are desirable. Cavity transport values of CT<0.5 are desirable. For increased light confinement, cavity transport values of CT<0.3 or even <0.2 may be used.

The fourth component, the small area light source, should have a tailored emission pattern which is optionally selected to compliment the angular transmission characteristics of the angle selective reflector on the front plate as discussed above. The small area source should not have a lateral emission pattern that would direct substantial amounts of the light parallel to the front or back reflector. Such emitted light would travel large distances and escape the local zone. The light source could optionally have an asymmetric azimuthal output, and, say, emit to one side only.

For enhanced uniformity it is possible for one or more sources to be within the zone of influence of an individual LED. Depending on system design criteria, it may be desirable to have a little or a large degree of overlap between zones of influence of neighboring LEDs. For example, having low overlap provides the ability to significantly dim a portion of the display. This provides advantages of maximizing contrast and energy savings in zoned systems however it also makes the system vulnerable to failure of an individual LED. It may indeed be desirable for some systems to intentionally have overlapping zones of influence so as to achieve a more favorable balance of system robustness with still useful levels of power savings and contrast.

A zone of influence may be considered to be the area over which the light intensity of a local source (i.e. a single LED, or a local cluster of LEDs) falls to 1/e of the intensity at the center of the zone. (Cluster=a number of LEDs that are mounted on the same chip or heat sink and are within a few mm of each other.) The zone of influence of a local source may overlap the nearest neighbor zones or the second nearest neighbors, or even the third nearest neighbors, depending on the degree of uniformity and the required zone sizes. The local sources can be arranged in linear, square, rectangular, hexagonal, or other patterns, including a random array.

It would be desirable to have one or more optical sensors to detect the output at a particular point in the backlight and through feedback circuit adjust the output of the individual LEDs according to a control scheme.

Though a spatially invariant solution is preferable, it would be possible to have a spatially variant solution and, for example, have printed diffusing or reflective dots or patches directly above each source to help reduce the "punch through".

Unless otherwise indicated, all numbers expressing quantities, measurement of properties and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the scope and spirit of this invention, and it should be understood that this invention is not limited to the illustrative embodiments set forth herein. All U.S. patents, patent application publications, and other patent and non-patent documents referred to herein are incorporated by reference, to the extent they are not inconsistent with the foregoing disclosure.

The invention claimed is:

1. A lighting system, comprising:
   a light source; and
   a multilayer optical film disposed to reflect some light from the light source and to transmit other light from the light source, the multilayer optical film having a first internal Brewster angle associated with a first in-plane axis and a second internal Brewster angle associated with a second in-plane axis orthogonal to the first in-plane axis, the second internal Brewster angle being different from the first internal Brewster angle.

2. The system of claim 1, wherein the system comprises a luminaire.

3. The system of claim 2, wherein the luminaire comprises a stiff light-transmissive panel.

4. The system of claim 3, wherein the multilayer optical film attaches to the panel.

5. The system of claim 4, wherein the multilayer optical film is laminated to the panel with substantially no intervening air gap.

6. The system of claim 1, wherein the system comprises a backlight.

7. The system of claim 6, wherein the backlight is an edge-lit backlight.

8. The system of claim 1, wherein the first in-plane axis is a strong axis and the second in-plane axis is a weak axis, and wherein the multilayer optical film reflects at least 75% of normally incident light in an extended wavelength band polarized parallel to the strong axis, and the multilayer optical film reflects at least 50% of normally incident light in the extended wavelength band polarized parallel to the weak axis.

9. The system of claim 8, wherein the multilayer optical film exhibits a first decrease in reflectivity as a function of incidence angle for p-polarized light incident in a first plane containing the strong axis, and the film exhibits a second decrease in reflectivity as a function of incidence angle for p-polarized light incident in a second plane containing the weak axis, and wherein the second decrease in reflectivity is stronger than the first decrease in reflectivity.

10. The system of claim 9, wherein the second decrease in reflectivity decreases by at least 50% at a particular oblique angle θoblique relative to normal incidence.

11. The system of claim 9, wherein the first decrease in reflectivity decreases by at least 40% at a particular oblique angle θoblique relative to normal incidence.

12. The system of claim 1, further comprising a structured surface layer coupled to the multilayer optical film.

13. The system of claim 12, wherein the structured surface layer comprises a prismatic film.

14. The system of claim 12, wherein the structured surface layer converts a wide angle batwing transmission characteristic of the multilayer optical film to a narrower angle batwing transmission characteristic.

15. The system of claim 12, wherein the structured surface comprises a 2-dimensional structure.

16. A lighting system, comprising:
a light source; and
a multilayer optical film disposed to reflect some light from the light source and to transmit other light from the light source, the multilayer optical film having an internal Brewster angle associated with each of two orthogonal in-plane axes, at least one of the internal Brewster angles corresponding to an incidence angle in air of less than 90 degrees.

17. The system of claim 16, further comprising a back reflector disposed to form a light recycling cavity with the multilayer optical film, the back reflector having a transport ratio T<0.

18. The system of claim 16, further comprising a back reflector disposed to form a light recycling cavity with the multilayer optical film, the recycling cavity having a cavity transport CT<0.25.

* * * * *

UNITED STATES PATENT AND TRADEMARK OFFICE
CERTIFICATE OF CORRECTION

Page 1 of 1

PATENT NO. : 8,662,687 B2
APPLICATION NO. : 13/129430
DATED : March 4, 2014
INVENTOR(S) : Michael Weber It is certified that error appears in the above-identified patent and that said Letters Patent is hereby corrected as shown below:

In the Specification

Column 16
Line 10, After "pointing" insert -- away --.

Column 30
Line 8, Delete "$\theta\Phi e$," and insert -- $\Delta\Phi e$, --, therefor.

Column 33
Line 19, After "spread" insert -- away --.
Line 36, After "light" insert -- away --.

Signed and Sealed this
Twenty-first Day of April, 2015

Michelle K. Lee
*Director of the United States Patent and Trademark Office*